(12) United States Patent
Fonseca dos Reis et al.

(10) Patent No.: US 11,596,109 B2
(45) Date of Patent: Mar. 7, 2023

(54) HIGH DENSITY PLANT GROWTH SYSTEMS AND METHODS

(71) Applicants: Joao Luis Pinto Fonseca dos Reis, Pittsburgh, PA (US); Joao Miguel Severino Mendes, Lisbon (PT)

(72) Inventors: Joao Luis Pinto Fonseca dos Reis, Pittsburgh, PA (US); Joao Miguel Severino Mendes, Lisbon (PT)

( * ) Notice: Subject to any disclaimer, the term of this patent is extended or adjusted under 35 U.S.C. 154(b) by 0 days.

(21) Appl. No.: 17/077,508

(22) Filed: Oct. 22, 2020

(65) Prior Publication Data
US 2021/0112728 A1     Apr. 22, 2021

Related U.S. Application Data

(60) Provisional application No. 62/924,455, filed on Oct. 22, 2019.

(51) Int. Cl.
*A01G 9/029*     (2018.01)
*A01G 9/02*      (2018.01)
(Continued)

(52) U.S. Cl.
CPC ............ *A01G 9/029* (2018.02); *A01G 9/023* (2013.01); *A01G 24/46* (2018.02); *A01G 27/003* (2013.01);
(Continued)

(58) Field of Classification Search
CPC ........ A01G 9/022; A01G 9/023; A01G 9/029; A01G 9/0297; A01G 9/24; A01G 9/247;
(Continued)

(56) References Cited

U.S. PATENT DOCUMENTS 2,062,755 A      12/1936 Lyons et al.
2,952,096 A *     9/1960 Hughes .................. A01G 31/06
                                                    47/60
(Continued)

FOREIGN PATENT DOCUMENTS

CN    108966949 A  * 12/2018
DE    102015003168 B3 *  6/2016 ............. A01G 24/44
(Continued)

OTHER PUBLICATIONS

English-language translation of CN 108966949 (Year: 2018).*

*Primary Examiner* — Christopher D Hutchens
(74) *Attorney, Agent, or Firm* — Dentons Cohen & Grigsby P.C.

(57) ABSTRACT

Systems and methods for vertical farming that reduce the deployment cost, operational costs of human labor, and overall use of energy intensive processes, such as lighting, heating and cooling, and ventilation, while increasing crop quality and yield. This reduction is achieved through a hybrid system that alternates natural light, temperature, and ventilation sources with system-controlled lighting, temperature, and ventilation means. The system includes a germination module that allows seeds to germinal on a horizontal substrate, a growth module that provides optimal growth conditions to the germinated seed on the substrate in a vertical position, and a dosing module that controls the micronutrient mixture supplied to the growing plants.

22 Claims, 11 Drawing Sheets

(51) Int. Cl.
  *A01G 27/00* (2006.01)
  *A01G 31/06* (2006.01)
  *A01G 24/46* (2018.01)
  *A01G 24/25* (2018.01)
  *A01G 24/10* (2018.01)
  *A01G 24/18* (2018.01)
  *A01G 24/15* (2018.01)
  *A01G 24/28* (2018.01)
  *A01G 31/00* (2018.01)

(52) U.S. Cl.
  CPC ........... *A01G 27/005* (2013.01); *A01G 31/06* (2013.01); *A01G 24/10* (2018.02); *A01G 24/15* (2018.02); *A01G 24/18* (2018.02); *A01G 24/25* (2018.02); *A01G 24/28* (2018.02); *A01G 2031/006* (2013.01)

(58) Field of Classification Search
  CPC .... A01G 24/46; A01G 27/003; A01G 27/005; A01G 31/06; A01G 18/62
  USPC .............. 47/62 R, 62 A, 17, 65.9, 79, 82, 83
  See application file for complete search history.

(56) References Cited

U.S. PATENT DOCUMENTS

| | | | | |
|---|---|---|---|---|
| 3,458,951 | A * | 8/1969 | Martin | A01G 31/06 47/60 |
| 3,807,088 | A * | 4/1974 | Jones | A01G 31/02 47/62 N |
| 4,068,405 | A | 1/1978 | Campbell et al. | |
| 4,074,856 | A * | 2/1978 | Williams | A01G 25/095 239/1 |
| 4,075,785 | A | 2/1978 | Jones | |
| 4,268,994 | A * | 5/1981 | Urai | A01G 9/022 47/79 |
| 4,292,762 | A * | 10/1981 | Fogg | A01G 9/246 47/17 |
| 4,356,664 | A * | 11/1982 | Ruthner | A01G 31/042 47/65 |
| 4,713,909 | A * | 12/1987 | Roper | A01G 9/00 47/17 |
| 4,723,714 | A * | 2/1988 | Lucas | A01G 9/247 239/744 |
| 4,813,176 | A | 3/1989 | Takayasu | |
| 4,928,889 | A * | 5/1990 | Lucas | A01G 9/247 239/751 |
| 5,136,807 | A * | 8/1992 | Orlov | A01G 27/005 47/83 |
| 5,252,108 | A * | 10/1993 | Banks | A01G 9/143 47/58.1 R |
| 5,315,834 | A * | 5/1994 | Garunts | F24F 3/16 62/78 |
| 5,344,084 | A * | 9/1994 | Andrews | A01G 9/247 239/751 |
| 6,122,861 | A * | 9/2000 | Kertz | A01G 31/04 47/65 |
| 6,360,482 | B1 * | 3/2002 | Boyes | A01G 9/247 47/62 A |
| 8,327,582 | B2 | 12/2012 | Storey | |
| 8,443,546 | B1 | 5/2013 | Darin | |
| 8,505,238 | B2 * | 8/2013 | Luebbers | A01G 31/02 47/62 A |
| 8,516,743 | B1 * | 8/2013 | Giacomantonio | A01G 9/025 47/62 A |
| 8,533,993 | B2 | 9/2013 | Pettibone | |
| 8,578,651 | B1 * | 11/2013 | Giacomantonio | A01G 9/022 47/62 A |
| 8,777,123 | B2 * | 7/2014 | Stevens | B05B 1/205 239/1 |
| 9,010,022 | B2 | 4/2015 | Brusatore | |
| 9,247,688 | B1 | 2/2016 | Gurin | |
| D785,497 | S | 5/2017 | Storey | |
| 9,986,697 | B1 | 6/2018 | Gurin | |
| 10,070,600 | B2 | 9/2018 | Orff | |
| 10,201,122 | B2 | 2/2019 | Higgins | |
| 10,306,847 | B2 * | 6/2019 | Whitcher | A01G 9/246 |
| 10,390,495 | B2 | 8/2019 | Smith et al. | |
| 10,407,243 | B1 | 11/2019 | Sundaresan et al. | |
| 11,134,626 | B2 * | 10/2021 | Millar | A01G 27/003 |
| 2005/0246955 | A1 | 11/2005 | Bissonnette et al. | |
| 2008/0000153 | A1 * | 1/2008 | Sugiyama | A01G 9/025 47/47 |
| 2010/0024292 | A1 * | 2/2010 | Kertz | A01G 9/024 47/17 |
| 2011/0131876 | A1 | 6/2011 | Pettibone | |
| 2013/0019527 | A1 * | 1/2013 | Howe-Sylvain | A01G 31/06 47/62 A |
| 2013/0247462 | A1 | 9/2013 | Leslie | |
| 2014/0020292 | A1 | 1/2014 | McNamara et al. | |
| 2014/0115960 | A1 | 5/2014 | Kantola et al. | |
| 2014/0259908 | A1 | 9/2014 | Halmos et al. | |
| 2014/0338261 | A1 * | 11/2014 | Sykes | A01G 31/06 47/62 A |
| 2015/0223418 | A1 * | 8/2015 | Collins | A01G 9/16 47/62 R |
| 2015/0319947 | A1 * | 11/2015 | Smith | A01G 31/02 47/62 A |
| 2015/0342127 | A1 | 12/2015 | Gallant | |
| 2016/0029578 | A1 * | 2/2016 | Martin | A01G 7/045 47/62 R |
| 2016/0212948 | A1 * | 7/2016 | McGuire | C02F 9/00 |
| 2016/0235025 | A1 | 8/2016 | Bray | |
| 2017/0172082 | A1 * | 6/2017 | Weiss | A01G 31/06 |
| 2017/0339846 | A1 | 11/2017 | Lawrence et al. | |
| 2018/0263201 | A1 | 9/2018 | Linneberg | |
| 2018/0325055 | A1 | 11/2018 | Krakover | |
| 2018/0343810 | A1 | 12/2018 | Counne | |
| 2019/0029166 | A1 * | 1/2019 | Goodman | A01G 24/46 |
| 2019/0159415 | A1 | 5/2019 | Bertram et al. | |
| 2019/0246584 | A1 * | 8/2019 | Hsueh | A01G 31/02 |
| 2020/0236883 | A1 | 7/2020 | Ambrosi | |
| 2020/0329654 | A1 | 10/2020 | Westlind et al. | |
| 2021/0144930 | A1 * | 5/2021 | Breza | A01G 9/022 |

FOREIGN PATENT DOCUMENTS

| | | | | |
|---|---|---|---|---|
| KR | 20030001853 | A * | 1/2003 | ............ A01G 9/247 |
| WO | WO-8807321 | A1 * | 10/1988 | ............ A01G 9/247 |
| WO | WO-9532613 | A1 * | 12/1995 | ............ A01G 9/247 |
| WO | WO-2007106527 | A2 * | 9/2007 | ............ A01G 24/46 |
| WO | WO-2009122210 | A1 * | 10/2009 | ............ A01G 9/025 |
| WO | WO-2011033316 | A2 * | 3/2011 | ............ A01G 24/15 |
| WO | 2014/113838 | A1 | 7/2014 | |
| WO | WO-2017134171 | A1 * | 8/2017 | ............ B32B 5/26 |
| WO | WO-2019118138 | A1 * | 6/2019 | ............ A01G 9/025 |
| WO | WO-2021055444 | A1 * | 3/2021 | |

* cited by examiner

HIGH DENSITY PLANT GROWTH SYSTEMS AND METHODS

CROSS REFERENCE TO RELATED APPLICATIONS

The present application claims the benefit under 35 U.S.C. § 119(e) of prior U.S. Provisional Application Ser. No. 62/924,455, filed Oct. 22, 2019, the content of which is incorporated by reference here into this application.

TECHNICAL FIELD

The present invention relates to vertical farming systems and methods that provide high density farming for a broad range of plant species.

BACKGROUND

Conventional vertical farm systems generally employ a vertical structure supporting one or more stacks of trays positioned horizontally, wherein the trays contain soil and/or growth media for growth of plants. Each stack of trays may be provided with water, nutrients, and light that are suitably controlled to optimize plant growth to maturity. Space efficiency and frugal use of scarce resources while also maximizing crop output are important drivers for vertical farming systems and methods.

Prior art geometries for staking these trays for hydroponics fertigation include arranging them in stationary horizontal arrays deployed either in large scale units (U.S. Pat. Nos. 2,062,755, 8,443,546, 9,010,022, 9,986,697, and 10,407,243; US Pat. Pubs. 2005/0246955 and 2018/0343810; and International Pat. Pubs. WO2012/040776, WO2014/113838, WO2019/030606A1 and WO2017/205523A1) or in miniature units (U.S. Pat. No. 4,713,909); on large scale conveyor belts (U.S. Pat. Nos. 4,068,405, 8,533,993, and 10,201,122; US Pat. Pub. 2011/0131876; and International Pat. Pub. WO2011/061634A2); on stationary vertical growth poles (U.S. Pat. Nos. 8,327,582, 10,390,495, and D785497; and US Pat. Pubs. 2014/0020292A1, 2014/0115960, and 2015/0342127); or even vertically on a conveyor belt (U.S. Pat. No. 10,306,847) or on a trolley (International Pat. Publication WO2017/184448A1). Other geometries include a rigid oblique surface with individual holes for each plant (U.S. Pat. No. 4,075,785) or a single panel vertical surface (U.S. Pat. No. 8,516,743).

In general, the prior art presents a poor trade-off between deployment cost for the disclosed systems and the marginal growth area effectively gained by the alternate farming methods detailed therein (i.e., the vertical farming). High towers of stationary trays imply using forklifts and expensive metal framing. Miniature independent units do not allow the costs of pumps, piping, and misters to be spread over a large growth area to foster cost synergies. The costs of conveyor belts scale much faster than their linear dimensions. Vertical poles provide minimum increments in growth area that is adequate mainly for "big leafy" crops such as lettuce and spinach, but not for smaller crops such as "microgreens", mushrooms, and herbs (or for crops that humans eat only the fruit, such has strawberries). Rigid surfaces are not flexible enough to be used across different cultures, or different stages in the plant life, as the holes made to place the growth media for the plants and the associated piping cannot be easily moved. Finally, the single panel vertical surfaces of hydroponic media are ideal for landscape plants (that are planted once and left in place for years), but are not adequate for high rotation crops since recycling the growth media at the end of each growth cycle is extremely labor intensive (unless it is simply thrown away).

In a particular example, a vertical surface for a hydroponics fertigation is described in International Pat. Pub. WO2019/118138, wherein the disclosed surface allows for use across singly stacked, discrete sections (poles) or as a continuous roll, and relies solely on rigid piping. Likewise, aeroponics fertigation systems based on horizontal layers (U.S. Pat. Nos. 4,813,176 and 10,070,600; and US Pat. Pub. 2018/0325055 and International Pat. Pub. WO 2012/040776) or based on columns with pre-assigned locations for plants (U.S. Pat. No. 8,505,238; and US Pat. Pub. 2018/0263201) have been disclosed. As with the prior examples, each relies on rigid piping for fertigation.

US Pat. Publication 2019/0159415 also discloses a vertical surface using aeroponics fertigation having a rigid surface with holes, and thus suffers from the same operational difficulties as those systems disclosed in U.S. Pat. Nos. 4,075,785 and 8,516,743.

Other systems describe vertical growth of the plants, such as described in U.S. Pat. No. 4,075,785, wherein plants are germinated in soil plugs that are then positioned on vertically inclined growth panels. U.S. Pat. No. 10,306,847 also describes a system that includes placing germinated seed plugs, i.e., seeds germinated in plugs of growth media, on a vertical growth column. Both U.S. Pat. No. 10,390,495 and International Pat. Publication WO 2019/118138 describe systems that provide growth of plants on a vertically supported multilayer substrate. As with each of the prior examples, the seeds are germinated in a separate step and are inserted into the substrate as plugs.

International Pat. Pubs. WO2012/040776 and WO2014/113838 describe watering and drainage arrangements for multilayer horticultural structures organized in horizontal arrays deployed in large scale hydroponic fertigation. These include plant trays arranged in rows and columns provided within a supporting framework that includes a watering and drainage system. The plant trays are inserted into or removed from the structure with the aid of a lift truck or similar lifting equipment or, on a smaller scale, manually. The geometry described in these references, i.e., horizontal trays supported in a metal structure, in addition to the watering and drainage systems are all static, inflexible structures.

Each of these prior art plant growing systems are typically used in man-made enclosures with environmental controls, such as control heating, dioxide carbon and humidity levels, which extend the growing season. For example, U.S. Pat. No. 4,068,405 describes an apparatus for maintaining a controlled environment for the growth of plants, including an enclosure with a plurality of artificial light sources positioned over a growing region. Trays containing the growing plants are carried through the enclosure by an endless chain drive coupled to a tray support structure and are accessible at an end of the enclosure for manual planting, weeding, harvesting and like activities. The chain drive further provides cyclical exposure to the lighting system to mimic the day/night light cycle for the plants. None of the prior art references describe hybrid systems that merge the use of natural (or passive) lighting, heating and ventilation coupled with man-made (or active) methods to simultaneously achieve optimal levels, stabilize those levels, and lower operational energy costs.

While the disclosed controlled environments may remove the need to use pesticides and other weed killers, these systems generally do not take advantage of the natural lighting and other environmental resources that could reduce overall energy usage and costs. Moreover, while growth in horizontal trays may reduce the addition steps required in the vertical farming systems (i.e., planting seed in a plug of material and replanting the germinated seed plugs in the vertical substrate), the horizontally stacked trays coupled with rigid piping typical of hydroponics substantially increase the infrastructure required to provide water, nutrients, and light, such as disclosed in International Pat. Publication WO 2014/113838 A1 and reduce its operating flexibility.

Additionally, few of the prior art systems disclose automated means to provide water and a proper mix of nutrients to the growing plans that may maximize crop yield. Those that do disclose such an operation often fail to provide effective controls for the amount of nutrients provided over time to the growing plants. For example, U.S. Pat. No. 9,247,688 discloses a dosing operation that delivers water and nutrients but does not combine it with offline measures to adjust different nutrients in the mixture. This limits the number of times the fluid can be circulated in the system and does not allow for organic fertilizers (such as urea) to be used in the system since they cannot be detected by electrical conductivity sensors. Neither does it cater to any kind of value-added operation, such as to nutrients being fed into the system.

Accordingly, the present disclosure aims to provide systems and methods that increase crop yields and crop density while also reducing overall labor and material costs through judicious combinations of readily available resources, such as light and heat, and environmental controls.

SUMMARY

The present invention provides systems and methods for vertical farming that reduce the overall use of energy intensive processes, such as lighting, heating and cooling, and ventilation, while increasing the crop quality and yield. This reduction may be achieved through a hybrid system that alternates natural light, temperature, and ventilation sources with system-controlled lighting, temperature and ventilation means using a unique geometry for germination and growth of the crops.

The inventive geometry presented herein is easily scalable and is flexible enough to be used, with no change whatsoever, across multiple crops and planting densities (e.g. microgreens, baby greens or fully mature crops). This is achieved using aeroponic fertigation delivered through a moving mister that covers a wide vertical surface. Furthermore, operational costs are substantially reduced as compared to other design choices by the use of modular trays that allow germination and growth on the same substrate, coupled with custom-made greenhouse(s) that take advantage of a mixture of active and passive methods to control indoor conditions.

Accordingly, the present invention relates to a system for vertical farming based on aeroponics and comprising six key components: flexible trays that can be used across multiple growth media, a germination module that allows seeds to germinate on a horizontal substrate inside a "growth tower", a moving mister that allows aeroponic fertigation to be used across a wide area using much less infrastructure than other geometries, a "growth tower" module that provides to the germinated seed the optimal growth conditions of watering schedule and lighting levels, a dosing module that controls in real-time a micronutrient mixture across pH and concentration level that is being supplied to the growing plants on the vertically positioned trays, and a water treatment module that can use aerobic and/or anaerobic processes through cover crops or bacteria colonies.

The present invention also relates to a unique architecture of a vertical farming system that optimizes external input of natural light, temperature, and ventilation sources in a hybrid system having means for controlled lighting, temperature and ventilation through the deployment of the growth and germination towers inside a custom designed greenhouse.

BRIEF DESCRIPTION OF THE DRAWINGS

A better understanding of the present invention will be had upon reference to the following detailed description when read in conjunction with the accompanying drawings, wherein like numerals represent like features in the various views. It is to be noted that features and components in these drawings, illustrating views of embodiments of the present invention, unless stated to be otherwise, are not necessarily drawn to scale.

FIGS. 7A and 7B show graphical simulations of nutrient control functions, wherein FIG. 7A shows response to varied fertilizer concentrations, and FIG. 7B shows response to varied pH values in accordance with certain aspects of the present disclosure.

DETAILED DESCRIPTION

Figure 1:
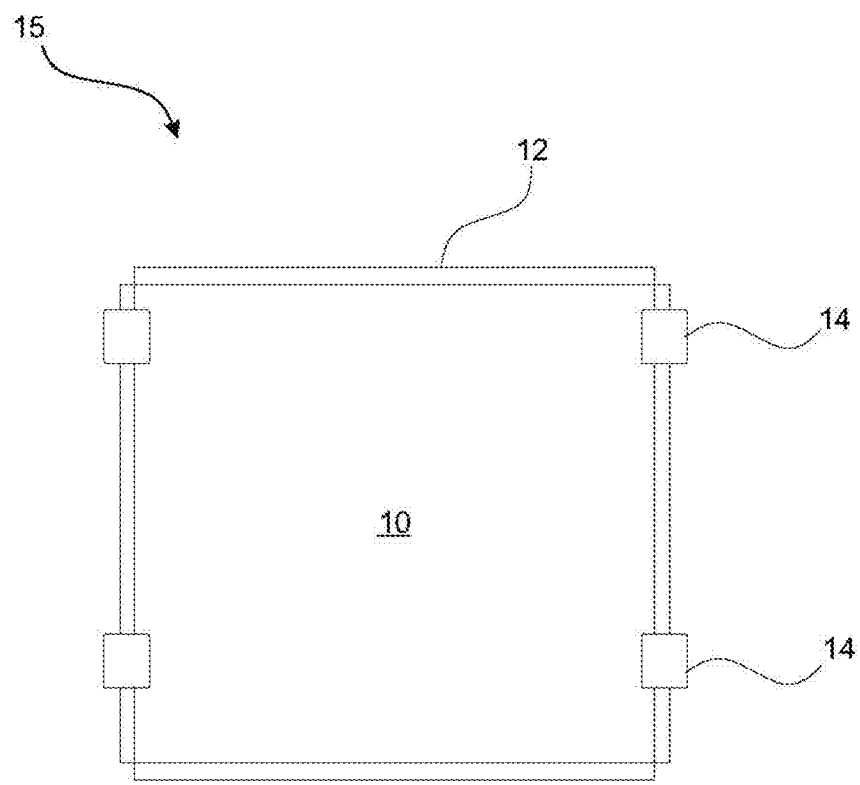
FIG. 1 shows a schematic diagram of a modular tray in accordance with certain aspects of the present disclosure.

As generally used herein, the articles "one", "a", "an" and "the" refer to "at least one" or "one or more", unless otherwise indicated. For example, although reference is made herein to "a" seed, "an" acid, and "the" substrate, one or more of any of these components and/or any other components described herein can be used.

The word "comprising" and forms of the word "comprising", as used in this description and in the claims, does not limit the present invention to exclude any variants or additions. Additionally, although the present invention has been described in terms of "comprising", the processes detailed herein may also be described as consisting essentially of or consisting of. For example, while the invention has been described in terms of a system comprising a horizontal germination module and a vertical growth module that use the same modular trays that include a recyclable plant growth media, a dosing module, and a water treatment module, a system consisting essentially of or consisting of the same components is also within the present scope. In this context, "consisting essentially of" means that any additional components in the process will not materially affect the plant growth density or output produced by the system.

The use of "or" means "and/or" unless specifically stated otherwise.

As used herein, the term "substantially" may be taken to represent the inherent degree of uncertainty that may be attributed to any quantitative comparison, value, measurement, or other representation. Thus, the term substantially may mean an amount of generally at least about 80%, about 90%, about 95%, about 98%, or even about 99%. If referring to a level of seed germination, for example, the term "substantially" may be referenced to an overall percentage of seeds that germinate in the germination module before transport to the growth module.

Other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the seed type, the substrate used, the duration and intensity of environmental additives (e.g., light, water, nutrients, temperature, etc.) and the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

"Including" and like terms means including, but not limited to. When ranges are given, any endpoints of those ranges and/or numbers within those ranges can be combined within the scope of the present invention.

In the following description, certain details are set forth in order to provide a better understanding of various embodiments of a system and method for high density growth of plants. However, one skilled in the art will understand that these embodiments may be practiced without these details and/or in the absence of any details not described herein. In other instances, well-known structures, methods, and/or techniques associated with methods of practicing the various embodiments may not be shown or described in detail to avoid unnecessarily obscuring descriptions of other details of the various embodiments.

The present invention relates to systems that provide high density growth of plants, such as plants for food production. The systems generally include, at a minimum, a germination module and a growth module that each use modular trays comprising a recyclable growth media (i.e., substrate), and a dosing module that provides a well-defined mixture of water and nutrients. The dosing module may allow manual correction of nutrient values such as pH and conductivity (i.e., indicating concentration of the various nutrients), and/or may perform these tasks automatically.

Figure 5:
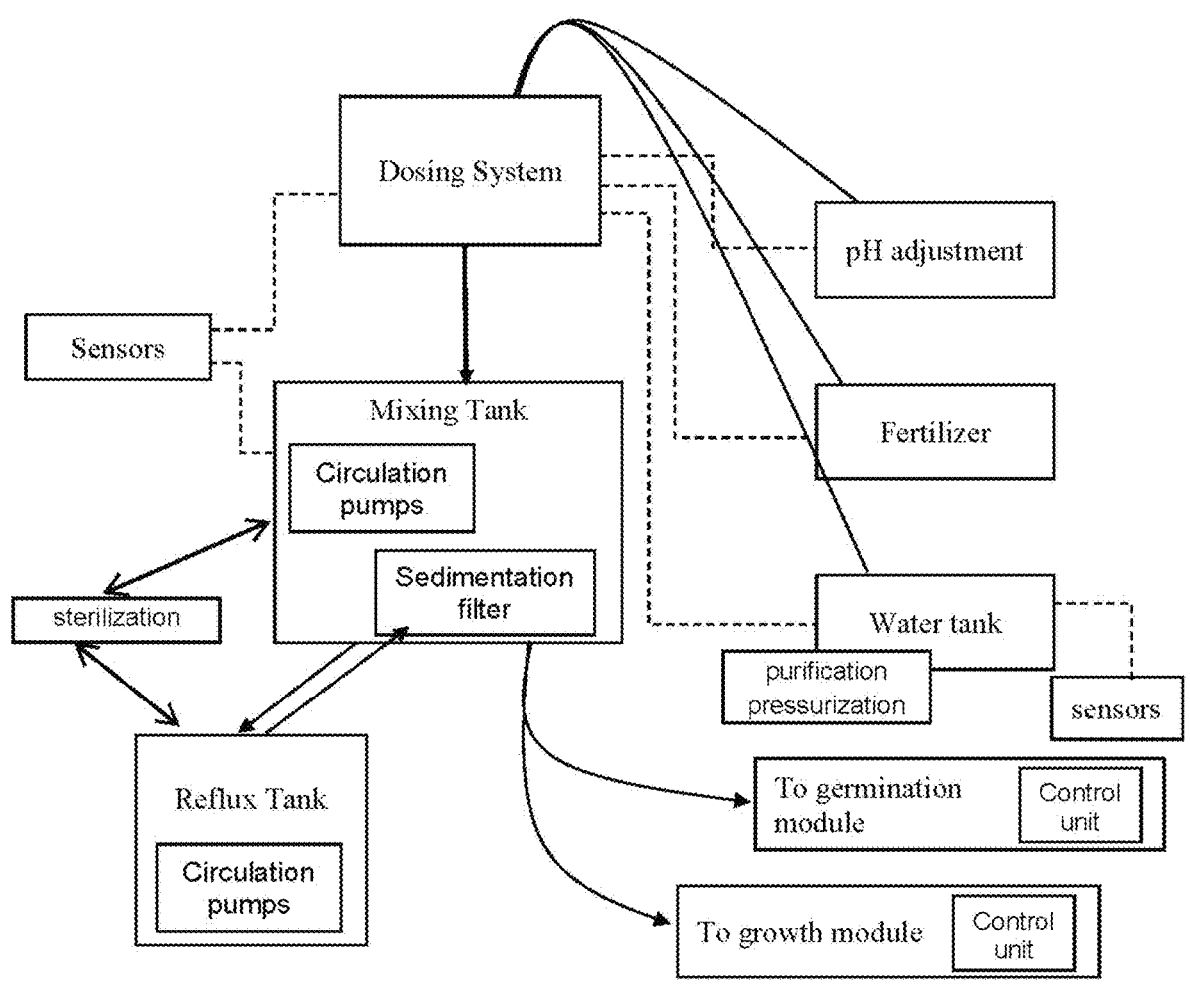
FIG. 5 shows a schematic overview of a high-density plant growth system in accordance with certain aspects of the present disclosure.

For ease of description, and with reference to FIG. 5, the presently disclosed system generally includes eight key components: modular trays, a germination module, a moving mister, a growth module, a dosing module, water treatment, media recycling, and optionally, a custom-made greenhouse. These various modules are described in greater detail below.

(a) Modular Trays

The unique arrangement provided by the present disclosure includes modular trays comprising a substrate that supports both the germination and growth phases of plant production. According to certain aspects, the substrate may be recyclable, and may thus be reused after each growth cycle (e.g. microfleece, perlite, etc.). According to other aspects, the substrate may be partially recyclable, or reusable for a limited number of growth cycles. For example, rock wool may be used for a single growth cycle as the primary substrate in the modular trays and may be reused by shredding into a potting mix additive. According to yet other aspects, the substrate may be a single use substrate due to difficulties or expense of cleaning and/or reclaiming the substrate after a first use, such as with potting mix.

With reference to FIG. 1, an exemplary embodiment of the modular trays of the present disclosure is shown. The substrate 10 may be attached to a frame 12, such as stretched over an open frame and attached along edge portions using clips 14 or other attachment means to provide a modular tray 15. While the substrate is shown in FIG. 1 as attached along opposing edges, attachment of the substrate to the frame may be along three or all four edges of the frame, or the frame may include two or more portions that accept the substrate therebetween. Moreover, while shown as an open square frame, other configurations are possible and within the scope of the present disclosure, such as a polygonal shape.

According to preferred aspects of the present disclosure, the substrate may be recyclable. As such, the substrate 10 may be removed from the frame 12, cleaned, and used in future growth cycles, thus reducing the cost of consumables and reducing waste in the overall process. The selection of an adequate substrate allows for this geometry to work as it eliminates the need for a sealed chamber where root misting is done aeroponically and enables for an "open structure" deployment as described herein. The presently disclosed modular trays offer several advantages, which include:

Integrated process: Growth media attached to trays provides an integrated process from seeding to germination. This media (i.e., substrate) may be single or multi-layered to adapt to the crops needs (water retention, aeration, roots photosensitivity) and maybe be reusable (e.g. fleece), reusable in a limited fashion or not at all (e.g. mineral wool such as rock wool, standard soils or paper media).

Flexibility: By using a continuous media surface instead of "media islands" at pre-assigned distances, the same tray may be used across multiple crops or for multiple end products of the same crop (e.g. "microgreens", "baby greens" or "full grown leafy greens").

Modularity: Using multiple "reasonably sized" trays makes for much easier handling, either manually or through robotic systems. Moreover, a water supply is not physically part of the tray, such as in hydroponics, so that each tray will be much lighter.

Multiple embodiments: Trays may be inserted horizontally in the germination module and use stationary (or wheeled hooks) to vertically attach in the growth module (described below).

Deployment limitations: While these trays offer numerous advantages, certain trade-offs between material resistance and the size of the trays are understood and may depend on at least the crop type and density, and the expected yields (e.g., overall weight of the crop).

Possible substrates may include single-layered or multi-layered media. While single layered media will limit the application to single piece materials such as fleece and foam, using a multi-layered approach that combines different media may include loose material in the inner layers when adequate or appropriate. Thus, applicable media may range from traditional soil up to soilless methods, such as but not limited to, man-made polymers (polyurethane), inert mineral materials (glass wool, stone wool/rock wool, perlite, vermiculite, pumice, clay pellets, pouzolane), or even materials with organic origin (peat moss, coco coir/fiber). When using dense non-neutral media with inherent high-water retention, such as for example rock wool that as a high pH, presoaking the media in a solution with the adequate pH is strongly recommended.

When the substrate comprises two layers, the roots may grow in the space between the first or top layer and the second or bottom layer of material. As indicated, according to certain aspects, the multiple layers may include additional media, or may be absent additional media.

(b) Single Unit Germination Module

Figure 2:
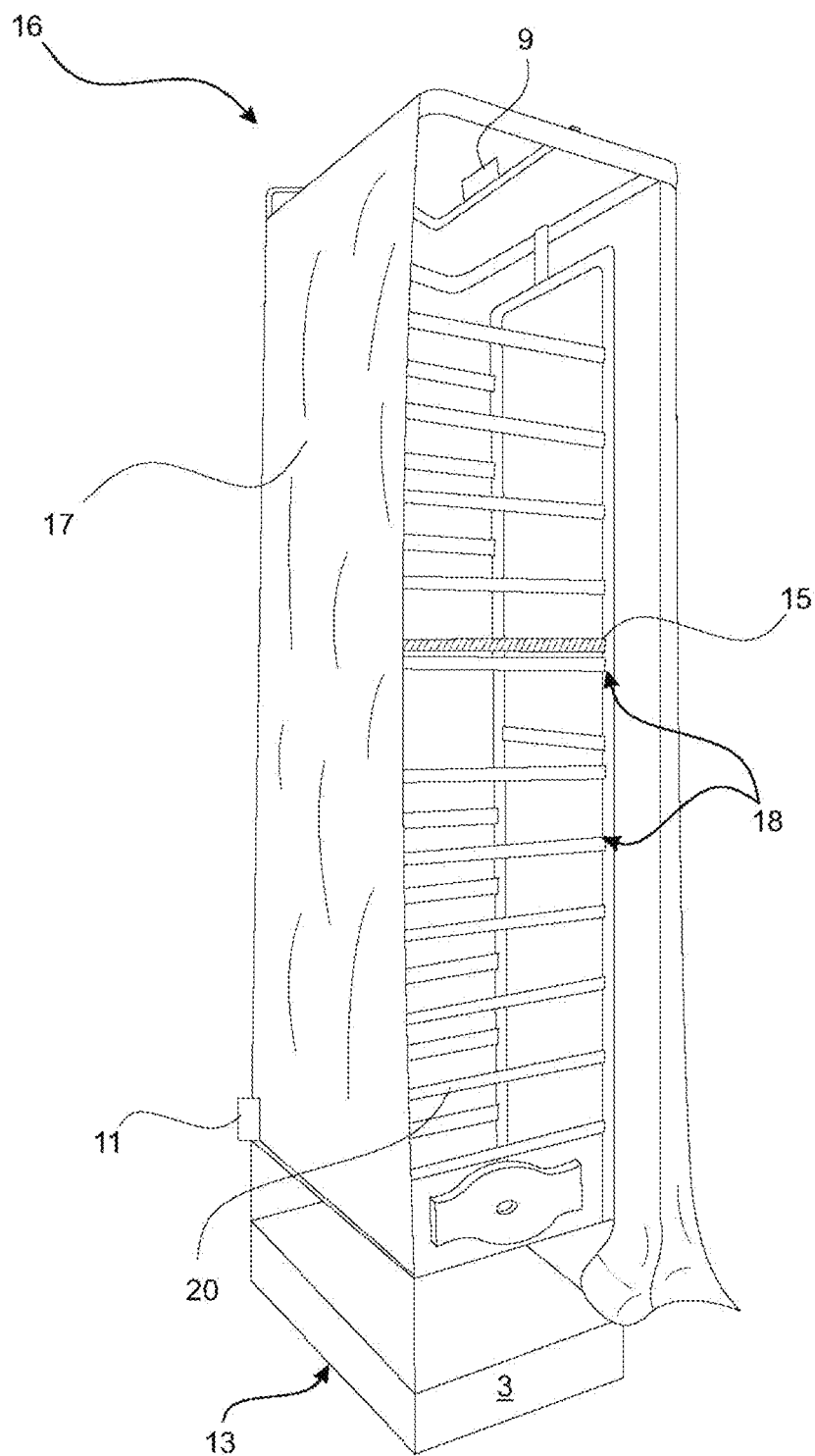
FIG. 2 shows a schematic diagram of a germination module configured to hold one or more modular trays in a horizontal position in accordance with certain aspects of the present disclosure.

According to certain aspects, the presently disclosed system may include a single unit germination module or tower that can be deployed indoors, in almost any type of location. The single unit germination tower (i.e., germination module) may comprise a tower structure configured to hold a plurality of modular trays in a horizontal orientation, a reflux tank, and a misting tank (i.e., water tank comprising nutrients, etc. that is used to supply the misters, also referred to as a mixing tank). With reference to FIG. 2, the substrate 10 attached to the frames 12 (i.e., the modular tray 15) may be positioned horizontally on racks 20 of the tower structure 16. The reflux tank 13 may be positioned beneath the racks holding the modular trays 15 (i.e., the tower is positioned on top of the reflux tank). In this configuration, any excess water 3 used to wet the seeds on the modular trays in the germination tower will fall back to the reflux tank. According to certain aspects, the reflux tank 13 may include a cover having a set of small holes to accept the returned water as is drains downward from the modular trays or no cover at all (i.e., open tank below bottom level of the germination tower), and may thus work independently without any additional piping.

When the germination unit is positioned indoors, the reflux tank may be configured to be larger than the misting tank (also referred to herein as a mixing tank) that provides water to the seeds. Additionally, according to certain aspects, the germination towers may include a cover 17 to contain water provided to the germinating seeds within the tower unit. The presently disclosed single unit germination tower offers several advantages, which include:

Small, compact and flexible: The germination towers are compact units configured to cater to limited available indoor space. Moreover, because they integrate delivery and recycling of water within the unit, they can be placed indoors almost anywhere (as water mist is fully contained inside the structure).

Humidity: Humidity levels may be maintained using misting nozzles dedicated to each tray. For large scale units, additional external humidity controls may be used, such as those provided in a green house.

Misting and darkness: The light levels provided to the seeds may be adjusted by exchange of the cover, e.g., using a cover of different materials, opening the cover, or removing the cover. In general, seeds prefer to germinate in the dark, and as detailed herein, the cover may maintain darkness while also preventing the spread of the mist used to water the seeds.

According to certain aspects, the single unit germination tower may not include any external heat source, and may follow the external temperature (i.e., room temperature). According to other aspects, heaters 11 may be included as part of the germination tower. Power for such heaters may be standard AC or DC power from either a wall outlet or a battery pack. Alternatively, power for a heater may be provided by a solar unit 9 attached at a top or side of the germination tower. Thermal isolation would then be provided by the cover 17.

The germination module (e.g., single unit germination tower) may include a control unit that manages the timing of various stages of the germination, i.e., disinfection and watering. A user may interact with the control unit through a user input panel that may be connected to the control unit through a wired or wireless connection. Additionally, or alternatively, the user may interact with the control unit through a wired or wireless internet connection, e.g., via a cloud-based service.

According to certain aspects, water may be supplied to the seeds on the modular trays through misters 18 located in the germination tower so that they are positioned at corners of the modular trays. As shown in FIG. 2, the substrate 10 attached to the frames 12 (i.e., the modular tray 15) may be positioned horizontally on racks 20 of the tower structure 16 that may provide a disinfecting solution and/or water from sprayer units (misters 18) that are positioned at corners of the frames 12.

To get a smooth distribution of mist across the entire modular tray, without the need for additional metal framing, nozzles may be fit at each corner of the individual growth tower. To prevent the need for multiple pumps or extremely high-pressure pumps that would scale up the cost (directly through their price and indirectly through the need to deploy adequate tubing) each corner may have an independent tubing and four different solenoids that will direct the mist sequentially across them.

The water in the germination phase may be previously filtered to remove particulates and other contaminating chemicals and ions. For example, the water may be substantially absent of chlorine and high concentrations of salts, which is achieved at low cost by most reverse osmosis systems currently available. The reverse osmosis system may be positioned at the entrance of the system (e.g., before a water tank, see FIG. 5). According to certain aspects, there is no need to position the water purification system (i.e., reverse osmosis system) in the middle of multiple re-circulations inside the germination system as these may only need a normal paper particle filter (e.g. 1 micron) to prevent clogging the high-pressure misters.

Figure 6A:
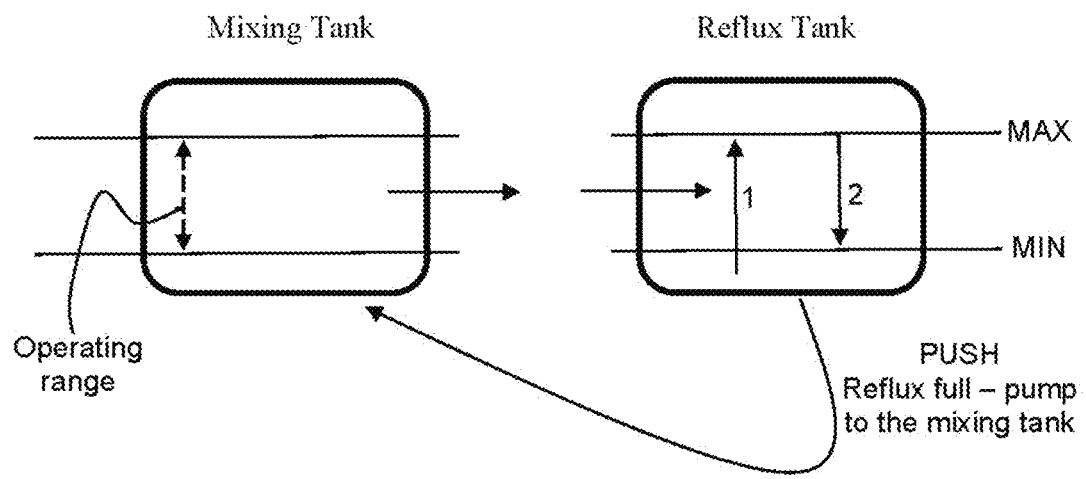
FIGS. 6A and 6B show graphical simulations of flow control functions from the growth tower in accordance with certain aspects of the present disclosure.
Figure 6B:
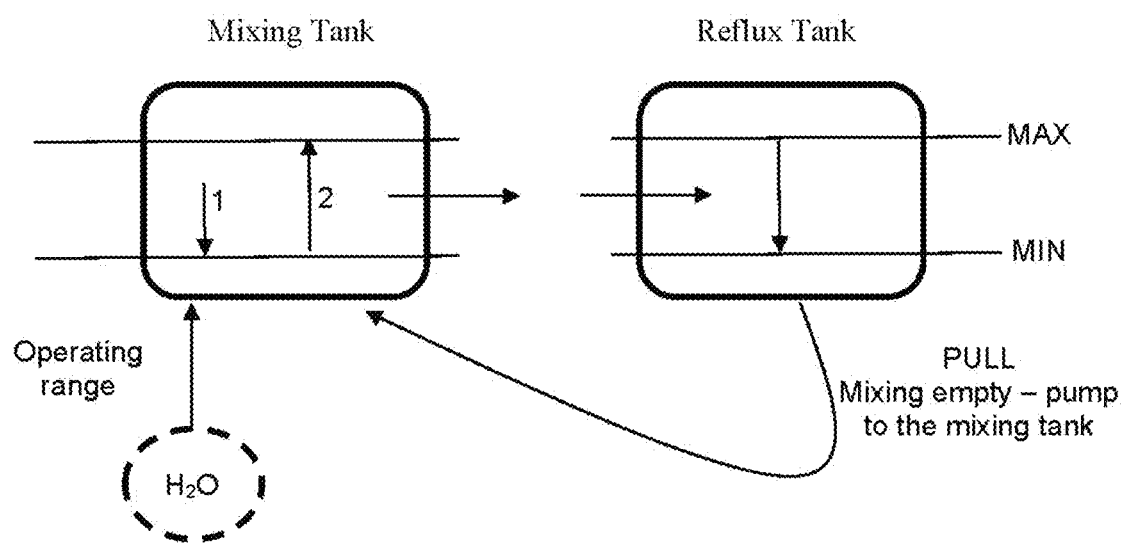

To prevent constant on-off behavior of the pump bringing water from the reflux tank into the mixing tank (i.e., water tank comprising nutrients, etc. that is used to supply the misters), a hysteresis cycle as shown in FIG. 6 may be used. For example, when the water in the reflux tank reaches a maximum level (MAX; arrow 1, FIG. 6A) it may be pumped back to the mixing tank until the water level in the reflux tank is at a minimum (MIN; arrow 2, FIG. 6A) or until the water level in the mixing tank is at a maximum (MAX). Additionally, should the water level in the mixing tank reach a minimum (MIN, arrow 2, FIG. 6B), water from the reflux tank may be pulled into the mixing tank from the reflux tank until the mixing tank is full (MAX, arrow 2, FIG. 6B), or the reflux tank has reached a minimum. Should the amount in the reflux tank be insufficient to bring the mixing tank level to the maximum, additional water from the water tank may be added. Such a system may apply to any water tank included in the system. Moreover, additional sensors may be positioned on the growth tower to prevent watering from initiating if there is insufficient water in the mixing tank.

The trays provide a frame holding the media where seeds can be deposited in a dry state making seed manipulation much easier. The term "seed," as used herein, includes but is not restricted to a ripened ovule of gymnosperms and angiosperms, which contains an embryo surrounded by a protective cover, the seed coat. Some seeds comprise a pericarp or fruit coat around the seed coat. In practical terms, the term "seed" is used to include anything that can be planted (sown) in agriculture to produce plants, such as true seeds, rootstock, plant cuttings and plant parts such as a tuber or bulb. Preferably, however, the term "seed" refers to its normal meaning in the art, namely the fertilized ripened ovule of a flowering plant containing an embryo and capable normally of germination to produce a new plant.

As previously indicated, the substrate is horizontally positioned in the germination module, as rooting has not yet taken place, and seeds are simply positioned on the top portion of the substrate with the adequate spacing for the intended crop and maturity level at harvesting (e.g. microgreens, baby greens or full growth big leafy). These germination towers may be seeded with seeds from a large variety of species. One or more modular trays may be placed on an architecture that holds each modular tray(s) in a horizontal position. An exemplary architecture includes a structure similar to a tray cart or rack (tower structure 16), as shown in FIG. 2. According to certain aspects, the tower structure may be moveable, e.g., may have wheels, and may include misters positioned at each level of the cart.

Once deposited on the substrate, seeds may be cleaned or "disinfected" by treatment with a sterilizing agent, such as hydrogen peroxide. As used herein, the term disinfect may be understood to mean cleaning or removal of a substantial amount of the seed-borne bacteria, fungi, and other pathogens different from bacteria, for example nematodes and seed-borne insects that may inhibit germination and/or growth of the seeds.

Seeds may be sprayed with the disinfecting solution to substantially saturate at least a top portion (e.g., saturate the top 20%, or 30%, or 50%) of the substrate. Alternatively, seeds may be sprayed with higher concentrations of the disinfecting solution, and after a short period of time be flushed out with an extended misting. Such treatment generally allows for seed disinfection without significantly affecting the seed quality or the germination properties.

A suitable disinfectant is, for example, a dilute aqueous solution of hydrogen peroxide, such as a solution containing an adequate amount of hydrogen peroxide (v/v) in line with the crops being seeded. Hydrogen peroxide degrades rapidly after use, and thus poses no rick for contamination of the water source used to water the seedlings in the following steps. Furthermore, in many crops it diminishes the rigidity of the seed walls making germination easier.

During the germination phase of seed growth, i.e., while in the germination module, the light and humidity conditions may be maintained according to the specific needs of the seed species. For example, additional light may be added when needed, and the humidity may be increased to induce germination. Fertilizer may be added to the water, but in much more diluted concentrations than what those crops will need when they reach maturity to prevent plant chock, leaves burn or other shortcomings.

After disinfection, the seeds may be watered from the same misters 18. The disinfecting solution and water may be collected in the reflux tank 13 that may be used to continue watering of the seeds as they germinate. The germination module may include pumps and filters as needed, and as described herein above, to provide the disinfecting solution and water to the modular trays.

Figure 3:
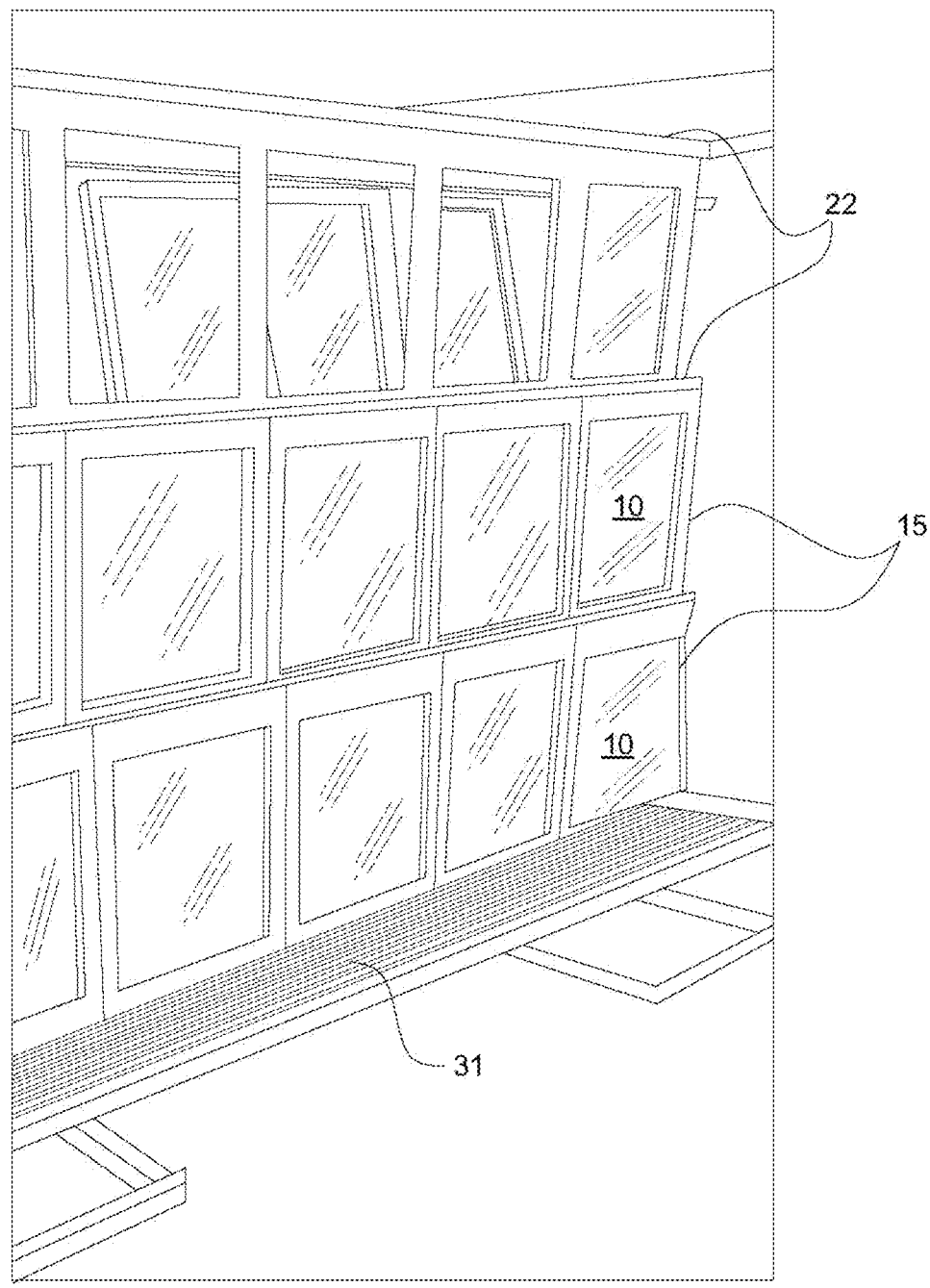
FIG. 3 shows a schematic diagram of a growth module configured to hold one or more modular trays in a vertical position in accordance with certain aspects of the present disclosure.

Once germinated, the modular trays may be removed from the racks 20 of the tower structure 16 and attached to a vertical rack (30a, 30b) in the growth module (see FIG. 3). That is, individual trays may be attached from one edge to a rail 22 in the growth module so that the modular trays hang with the substrate 10 positioned vertically. Such attachment may use the same clips 14 that hold the substrate 10 on the frames 12, or may use other means, such as for example a double frame tray. A double frame tray has the advantages of increased resistance to load and the ability of spreading the contact area holding the media to the tray, which is particularly welcome to prevent the degradation of soft media across time (such as for example when using fleece) the height of the tower may depend on the number of rails 22 in each rack (30a, 30b) and the size of the modular tray (i.e., dimensions of the tray 15 when attached in a vertical position on the rail).

(c) Moving Mister Coupled with Stationary Water Collector

Figure 4A:
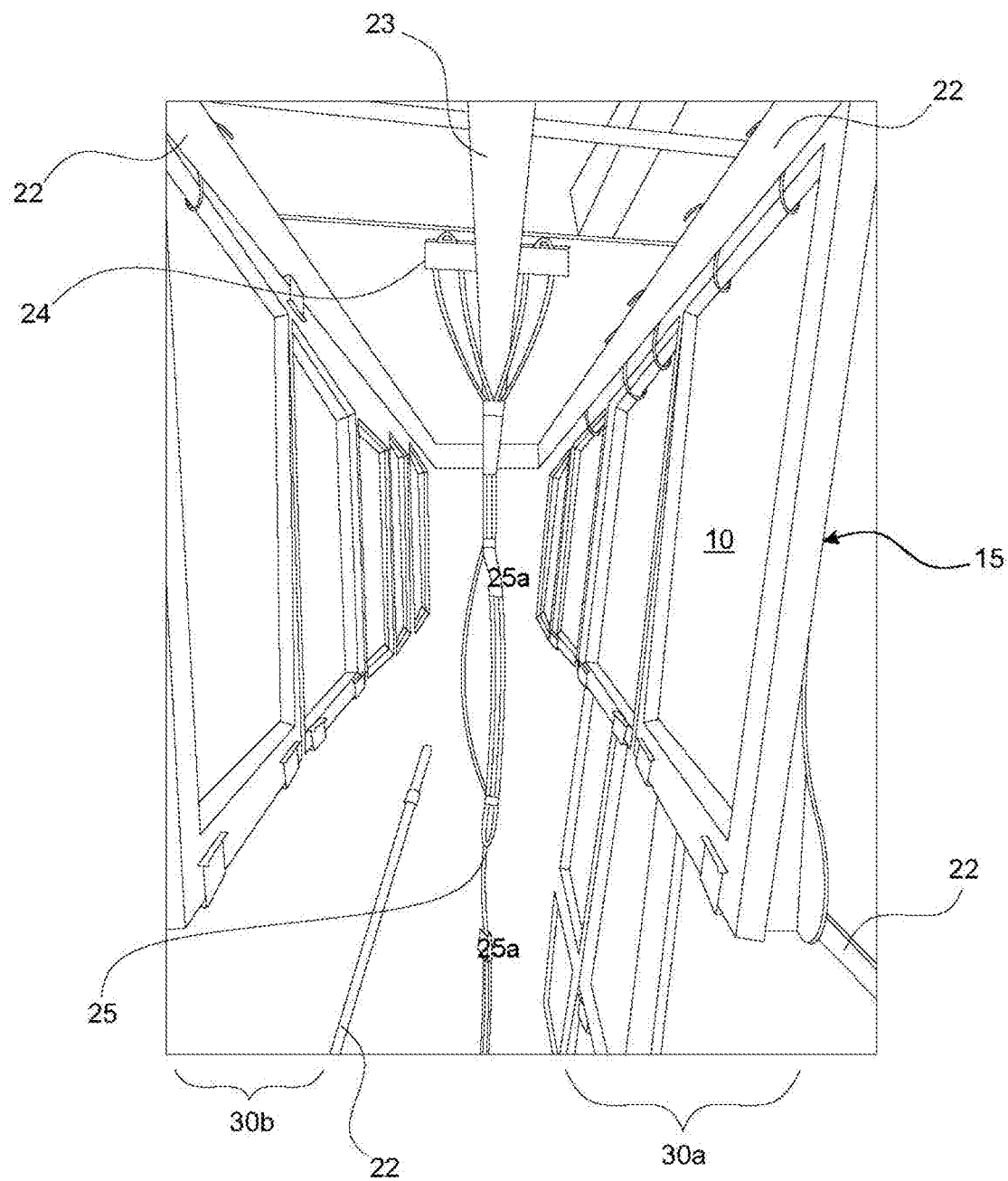
FIG. 4A shows a schematic diagram of a moving mister positioned between rows of vertical growth supports in accordance with certain aspects of the present disclosure.
Figure 4B:
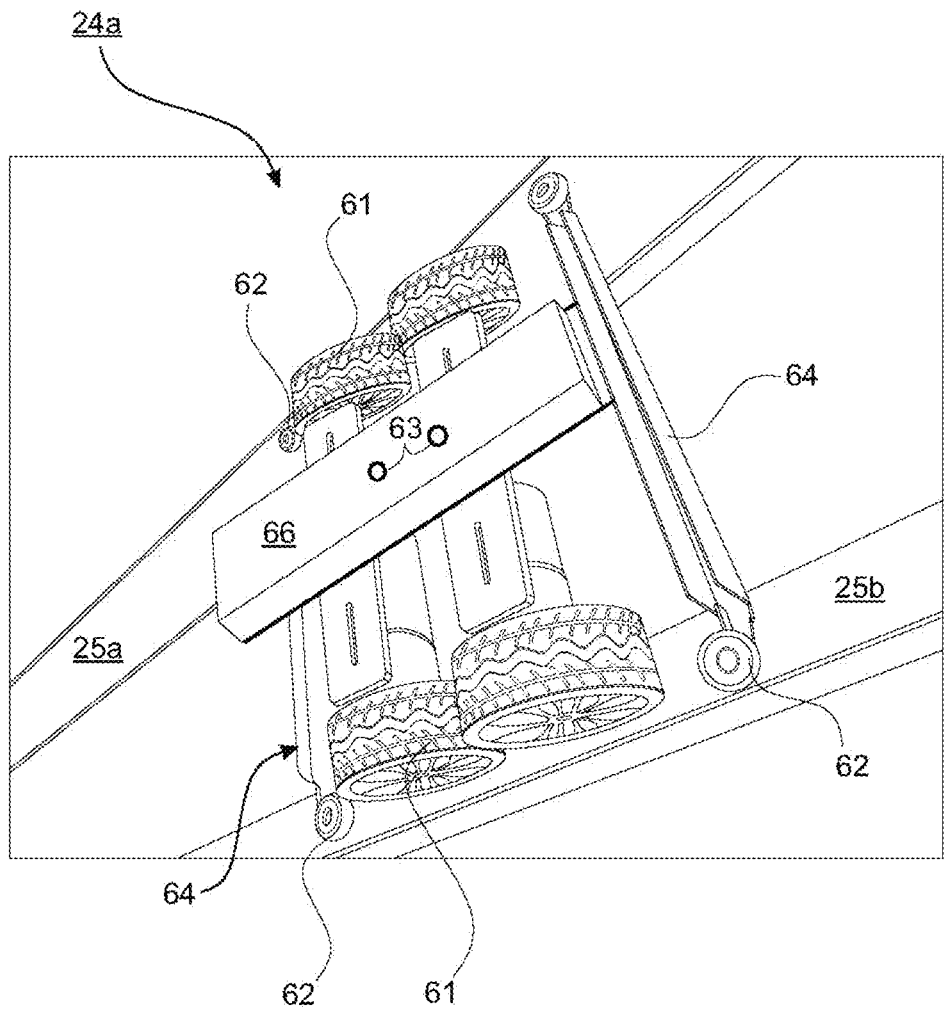
FIG. 4B shows a schematic diagram of another moving mister positionable between rows of vertical growth supports in accordance with certain aspects of the present disclosure.

The moving mister is a key component of the presently disclosed system and may enable the unique geometry of the growth tower disclosed herein. With reference to FIG. 4, the moving misters may be positioned on vertically extending hoses that are positioned on and moveable along a horizontal rail supported at a top of the growth towers (see FIGS. 4A and 4B). According to certain aspects, the misters may be customized for the architecture of the growth or germination modules, such as 3D-printed on some deployments that use an onboard motorized cart embodiment. As will be understood from the disclosure provided herein, the moving misters of the present disclosure provide several advantages:

Simplicity: Use of a moving aeroponic mister, piping, and associated pumps materially simplifies the watering process by removing the need for individual piping assigned to a specific area or plant. Water collection can be done with a single surface 31 at the bottom of the structure regardless of the misting schedule, provided that enough drainage is in place.

Scalability and low marginal cost: By sharing priming and pumps across a wide area, the moving mister will allow for sub-linear marginal costs. Pumps will still scale with the number of nozzles, but these scale only vertically (not horizontally). The only limitation for horizontal scaling is the amount of water that needs to be pumped for the covered surface, versus the speed the mister motors can transverse the covered area end-to-end.

Flexibility: The same setup may be used to cover a large number of crops by simply changing the speed at which the moving mister propels itself across the structure. On some extreme cases the motors and pumps (or even the flexible aeroponics tubing) may need to be changed, but such costs would be much lower than replacement of the entire system.

Stability of operation: To prevent control errors from accumulating across time, instead of tracking odometry (which is prone for example to slip error) to understand when the end of the rail has been reached, the change of state is done through actuating a contact switch mounted at each end of the rail. The mister may move along a single rail as shown in FIG. 4A or may move along a two-rail track as shown in FIG. 4B.

Durability & maintenance: The moving mister may be deployed using bobbins at each end of the structure or with on-board motorization. The advantage of the latter deployment is that all torque is applied to wheels 61 to move the cart from which the mister nozzles are suspended, and small deviations in the motors torque can easily be compensated with additional non powered wheels 62 supported on cross-brackets 64 to steer it on to a straight line. With specific reference to FIG. 4B, a cart 24a may move along a set of rails (25a, 25b) with the misting tubes suspended through ports 63 in a body 66 of the cart so that the misters 23 may be suspended there below. The cart may include a motor within the main body, or two or more of the wheels may be a direct drive wheel.

Deployment limitations: To prevent the flexible tubing used for aeroponics fertigation from getting entangled in the trays, or somewhere else, the aspect ratio of the supporting structure may be designed in such a way that the length travelled by the cart would not be bigger than twice the height between the mister and the water collection surface. Weights may need to be attached to the tubing to prevent it from rolling up. According to certain aspects, the system may include a mechanism that recoils the aeroponic tubing when needed, thus removing any constraint on the distance the moving mister may travel.

Different embodiments: Various other embodiments of this geometry may be actuated at both ends, such as two bobbins alternatively rolling/unrolling a flexible ribbon (or conveyor belts or transmission chains), or onboard motorized moving carts propelling the mister through rectangular or circular tubing, flexible belt, rope or ribbon. Different motors may be used to actuate the cart, such as AC, DC or steppers.

When implementing structures higher than what humans can reach, two possible configurations are possible: the "island" or the "cluster". In both configurations the trays are hung on the sides of the structure. The difference between the two configurations is that:

- On the "island" configuration, the trays face outwards from the metal structure and the mister travels inside the metal structure. To make the upper floors serviceable, the trays may need to be wheeled so that they can be loaded/unloaded at the end of the metal structure, and an elevator or stationary forklift may be used to raise an operator together with the trays being loaded/unloaded to the upper levels.
- On the "cluster" configuration, multiple parallel lines of growth towers may be used. The mister will move within the spaces between the towers and walking boards inside them may allow people to transverse through them. As such, trays may or may not be wheeled. An elevator or stationary forklift could also be used at the end of the structure.

Whether deploying an embodiment with actuators at the end, or onboard a cart, there needs to be a change of state when it arrives at the end of the structure. This can be done based on tracking its odometry (the number of turns the motor as done), but errors will accumulate across time in particular for large scale implementations with long structures. The simplest way to avoid this issue is for state changes to be triggered by contact buttons positioned at each end of the structure and actioned by the cart when it reaches that point.

In the embodiment with actuators at the ends, synchronization between motors can be done in closed loop or in open loop (see FIG. 3, motors at ends of the rail 23). In open loop, one may calibrate the torque of each motor so that the one pulling the cart has more voltage, while the other has just about enough voltage not to disturb that movement. In closed loop, rpm may be measured but it is not an optimal indicator as the effective radius of the bobbin will change across time as the ribbon gets rolled/unrolled. Monitoring the effective torque will also not be optimal since unwanted jerks are inherent, arising from the fact that, in the age of digital computers, motors are normally actuated with PWM controls (pulse-width modulation). Motorized carts would not suffer these possible errors as only a change state trigger at the end of a row would be needed to revise the direction of motion of the cart. Alternatively, or additionally, motorized carts may include timers that signal a change of state (i.e., direction).

The nozzles 25a may be embedded into the flexible aeroponics tube 25 that may be attached at a top end to a rail system positioned between rows of the modular trays (i.e., rail 23 between racks 22 in FIG. 4A). This allows the sprayer units (i.e., moving misters) to move horizontally between the vertically attached modular trays. According to certain aspects, the sprayer units may provide the water and nutrients, or feed solution, to a "the bottom" surface of the trays, the surface that was facing downwards during the stay in germination units, i.e., a side opposite from the original position of the seed on a top surface.

Excessive water may be collected with custom-made collection surfaces (31) or when convenient from a cost perspective, with surfaces wider than the cross section of the supporting structure that are simply bent over it (for example, aluminum roof tiles can easily be bent into a parabolic shape and fixed to the support structure). Using a thin opaque plastic sheet at both ends of the structure and on top of it is recommended to better contain moisture in the root area, avoid water leaks out of the tower and limit the amount of direct light that may hit the root zone.

(d) Commercially Scalable Growth and Germination Towers

When the moving mister is applied to germination towers, most of the structure needed for the "single unit growth towers", can simply be eliminated and replaced with a shared infrastructure that, by design, will enable for lower marginal costs with increasing scale.

Simplicity: The germination towers become just an open metal frame with wheels, where trays can be fitted horizontally.

Flexibility: Given the open nature of the towers, trays bigger than the transverse dimension of the tower can now be fitted with no limitation. However, given that nozzles have limited range, and to prevent the need for upgrading to prohibitively expensively high-pressure pumps, the smallest dimension (that will still be constrained by the tower dimension) should be orthogonal to the axis the mister is moving through.

Shared costs: While moving, the moving mister will be able to swipe across multiple towers without the need of multiple misting pump. Instead of four nozzles per tray (one at each corner) it will only have one, thus eliminating the four solenoid valves needed for the single unit germination tower.

Integration downstream: To facilitate the integration with the growth process, wheels may be fitted into the germination towers, so that together with their loaded trays, they can be moved near the growth towers where the trays will be loaded for the next stage.

Drainage & humidity: Both drainage and humidity may be managed at a room level, with particular care to be made on the drainage infrastructure that should drive water to the reflux tank with minimal impurities (e.g. a walk path may be put in place for people to transverse through and/or a sanitizing footbath mat at the room's entrance are highly recommended).

These towers may be as tall and as long as desired, with the main limitations being overall stability of the structure, means selected to attach and remove the modular trays, and the configuration of the moving misters. As indicated previously, individual walkways may be used at various levels of the tower, or robotic assistance may be used to attach and remove the trays (i.e., conveyor to move rack up/down in the germination and/or growth modules). A recoil mechanism may be used on the moving mister to prevent the flexible aeroponic piping from getting entangled either on the trays or on their supporting structure.

When the moving mister is applied to growth towers, all the above synergies still apply across multiple components in the growth towers, with a few exceptions. These exceptions are mainly concentrated on the fact that the modular trays (and their media) and the light source will still scale one to one with the size of the deployment.

Scheduling of the light source (e.g., LEDs) in the growth tower may be managed by a control unit. This can take into account specific lighting needs that may vary across one day or several days to mimic daily and season cycles against what is available at the location (whether from natural sources or other light sources) and accordingly turn on/off different lighting sections. The lights may be hung from a metal framing that may be a part of the growth towers or the location in which they are housed, and their distance to the trays may be adjusted either manually or through actuation, in order to save energy by diminishing the distance between the trays and the lights during the early stages of growth. The lights may be deployed vertically or horizontally, in the form of strips or tubes, single or multiple pieces depending on what is more convenient from a cost perspective and implementation perspective, to achieve the intended watt per square meter adequate for the crop being grown. FIG. 3 shows an embodiment with horizontally placed LED tubes as the light source, such as attached to or suspended from the support rails 22 for the trays. Other positions are possible and within the scope of the present invention.

(e) Dosing Module

A dedicated dosing module may be deployed in the germination phase, but given the short period of time that plants will remain in there, and the fact that most seeds already have all the nutrients in place for their pre-photosynthesis germination phase, most deployments will not need it as the fluid may be simply recirculated without additional manipulation other than filtering out particle debris. During the growth stage, a dosing process (whether manual or automated) may be implemented using the dosing module and the trays vertically attached to modular trays may be watered or "fed" with a water/nutrient mixture that needs to be periodically adjusted or even replaced.

The nutrient mixture source may comprise nutrients such as the standard nitrogen, phosphorous, and potassium adequate for the specific crop growing on the modular trays. One or more additional nutrient tanks may be included in the dosing module to provide additional nutrients to the mixing chamber. For example, individual tanks that comprise silica and calcium may be added to provide these nutrients to the mixing chamber. The mixture of water, nutrients, and additional nutrients (i.e., silica and calcium) is referred to herein as the feed solution.

The dosing system may combine online and offline measurements in order to extend the longevity of the nutrient mix. The online measures may be collected with probes that can continuously be submersed in the nutrients so that they can be tracked continuously and not just in limited time windows. Such probes or sensors may track pH and salt density (e.g. EC), and may need to be periodically recalibrated to also reflect changes in the mixture of ions within the solution. Ion mixes in the solution may change under the actions of the crops (that may add or subtract specific minerals to the water), as well as bacteria and fungi acting on organic matter. Ion specific probes are expensive and tend to measure only specific forms of the ion, not an element directly (e.g. nitrogen may be in organic form, ammonia, nitrite or nitrate). Thus, using online or offline spectrophotometer measurements to calibrate how the readings of the online EC sensors transform into the concentration of nutrients thought periodic sampling may allow for a much better cost effectiveness.

These online sensors may handle the different inputs added by the dosing module and may also handle the reflux from the growth towers. This is done by measuring the properties of what is inside the mixing tank against what is adequate for the crop for that point in time (as for example the needed concentration and mix of nutrients change across seeding, growth, flowering and fruiting for the same crop). Thus, rather than integrate the odometry of what was added by the mixing system across time (which compounds errors and does not take into account whatever is in the mixture that was not added by the dosing module), the presently disclosed doing module compares what it currently has versus what it would like to have and acts accordingly. That is, add nutrients or dilutes current nutrients to provide the currently needed mixture. The odometry may be used only as a control check to detect abnormal sensor behavior.

According to certain aspects, this module may include at least a water source, a pH adjustment source, and a concentrated nutrient source. These three sources should allow very different levels of maximum flows into the mixing tank:

Water sources should allow for a rapid flow as there is virtually no calamity risk of overshooting targeted levels, provided that the dosing module also controls the reflux pumps to prevent potential overflows of the mixing tank.

Nutrient sources should only allow for a medium flow level, because in the case of substantially overshooting the optimal nutrient concentration crops may even present burn marks.

pH adjustment sources should allow only for minute flows, as buffer solutions used to control pH levels can change the pH level very fast. Recovering from that overshooting may imply flushing the entire system, since compensating for it with pH additions in the opposite direction may lead to unacceptable levels of salinity in the resulting mix.

Figure 7A:
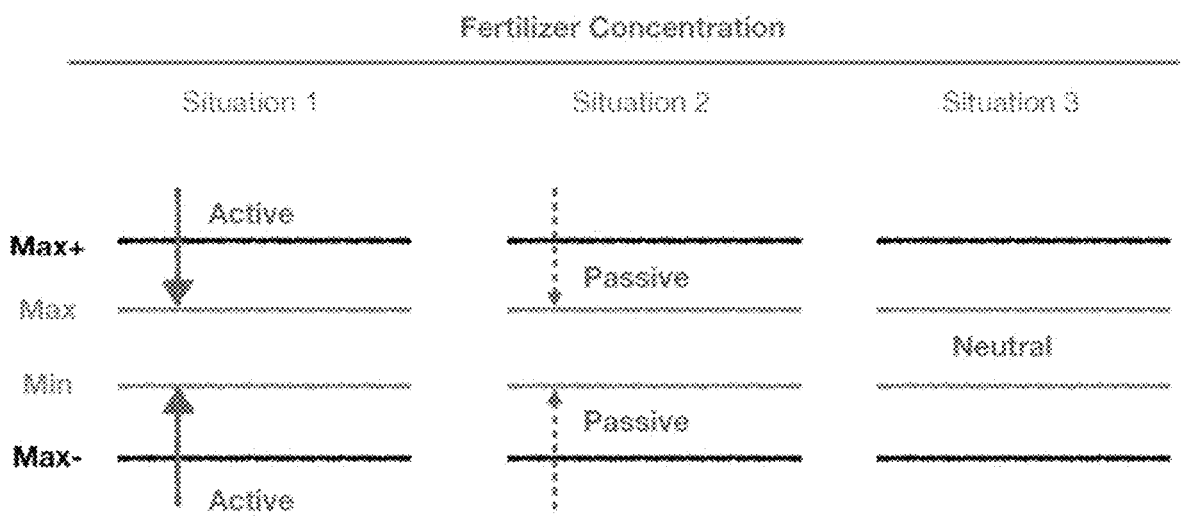
Figure 7B:
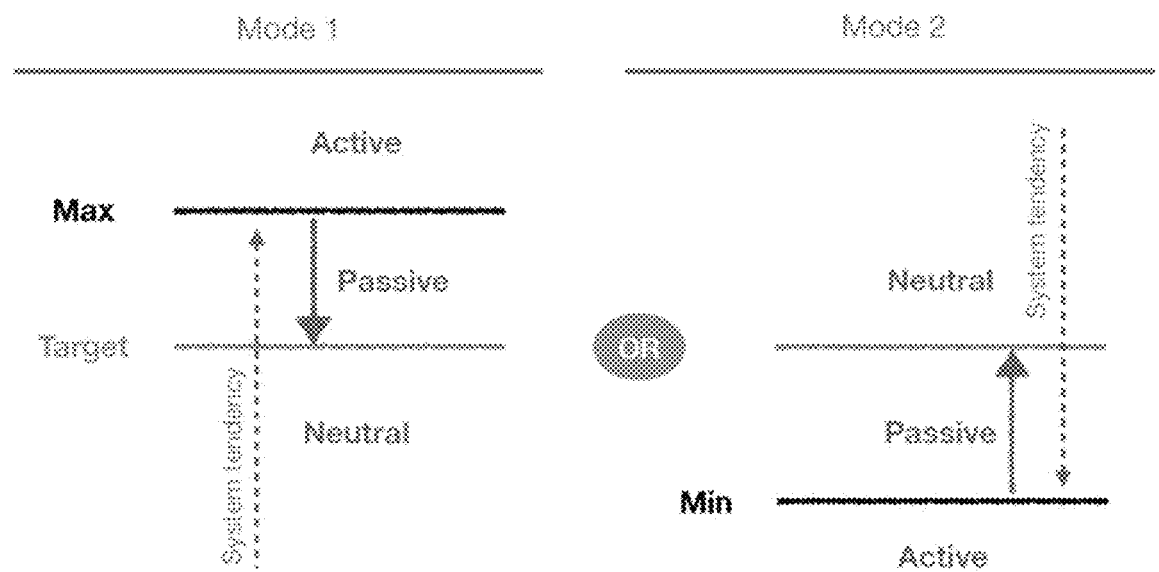

The dosing module uses proportional control to add water, fertilizer and pH adjustment to the solution. This minimizes overshooting the intended target parameters. As shown in FIG. 7A, water is added when the nutrient solution level is low or the nutrients concentration is high, fertilizer when the nutrients concentration is low. To prevent toxic accumulations of salt in the system, pH adjustments are only made in one direction (see FIG. 7B). Consistently adding the same fertilizer takes the pH in a specific direction, that will be counteracted if that pH is not adequate for the crop.

While using only proportional control in theory would avoid overshooting, local heterogeneities in large deployments and fast adjustments motivated by actuator inertia in small deployments may cause overshooting in practice, or the addition of multiple inputs may generate "cross-talk" (for example the concentrated fertilizer may have a different pH than what is intended and pre-adjusting it before injection may cause it to precipitate). Finally, pH and conductivity sensors can present wrong readings when mixing pumps are being actuated and thus generating electrical noise that may interfere with those sensor readings or organic matter diluted in the solution may be transformed into mineral form by the actuation of plants or bacteria (e.g. urea may be turned into ammonia, nitrites or nitrates). Thus, while solenoids can easily be used for actuating the flows from the water and nutrient sources, pH compensation should be done using more controllable methods such as peristaltic pumps with variable flow control.

The pH adjustment source may include a single source comprising either of an acid or a base. Alternatively, the pH adjustment may include two sources, wherein one comprises an acid and the other tank comprises a base. According to certain aspects, only one of the acid or the base will be available to the dosing module during a growth cycle while the other may be used for some manual situation where the opposite compensation of the naturally occurring deviation is needed for some specific reasons (e.g. an operational failure of some kind). That is, during the full life cycle of the plants while in the growth module, only one of the acid or the base may be used by the dosing module to adjust the pH of the water/nutrient mix.

For example, the pH may be adjusted to provide an expected final pH for the solution in the mixing chamber. Moreover, the conductivity may indicate that additional micronutrients (e.g., nitrogen, phosphorus, potassium) may need to be added. The pH and/or conductivity may be automatically read by the dosing module, and adjustment to the adequate levels may be made automatically or manually by a human operator, such as by either physically adding the necessary component or by inputting instructions to the processor of the dosing module to make the necessary changes.

With specific reference to FIG. 7A, when in the fertilizer concentration is in the active area, i.e., situation 1, the system will initiate an action that will continue until the max or min value is achieved. Alternatively, when the fertilizer concentration is in the passive area, i.e., situation 2, the system will continue the previously initiated action, but would not initiate an action de novo. Finally, when the fertilizer concentration is in the neutral area, i.e., situation 3, the system will not initiate an action and will terminate all previously started actions. With specific reference to FIG. 7B, the pH action zone may be configured to include only one active band. In general, systems tend to move in a single direction, and thus only acid or base is needed to correct the general tendency of the system when it deviate from the optimal pH zone. As with the fertilizer concentration corrections, when the pH is in the active zone, as in mode 1, the system will initiate a correction that will continue until the system is corrected to the target. Should the pH fall in the passive zone, as in mode 2, no correction would be initiated.

According to certain aspects, the dosing module may include a processor and memory that receive output from the one or more sensors and provide an input to the various tanks of the dosing module. This input may change a mixing ratio to optimize the feed solution with an expected or projected pH value, conductivity value, etc. in a closed loop.

Moreover, during various stages of growth, the mixture of nutrients, pH, water may be varied, and may be manually controlled, or may be automatically programed using a control unit associated with the growth module (a similar function is available for the germination module). The mixture and amounts of the various nutrients may also be varied based on crop type.

Implementations of the germination tower, growth tower and the dosing module are described within the context of a device configured to perform various steps, methods, and/or functionality in accordance with aspects of the described subject matter. It is to be appreciated that a dosing module including a computing device or computer system can be implemented by one or more computing devices. Implementations of the dosing module can be described in the context of a "device configured to", wherein the term configured may be taken to mean that the device can implement computer-executable instructions that are executed to perform various steps, methods, and/or functionality in accordance with aspects of the described subject matter.

In general, a computer system or computing device can include one or more processors and storage devices (e.g., memory and disk drives) as well as various input devices, output devices, communication interfaces, and/or other types of devices (e.g. user interface, networks). A computer system or computing device can also include a combination of hardware and software. As such, it should be appreciated that various types of computer-readable storage media can be part of a computer system or computing device. As used herein, the terms "memory", "computer-readable storage media" and "computer-readable storage medium" do not mean and unequivocally exclude a propagated signal, a modulated data signal, a carrier wave, or any other type of transitory computer-readable medium. In various implementations, the dosing module may include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

The dosing module can implement and utilize one or more program modules. Generally, program modules include routines, programs, objects, components, data structures, etc., that perform particular tasks or implement particular abstract data types. For example, the dosing module may include at least a sensor module that includes computer-executable instructions to receive output from one or more sensors that are part of the dosing module.

The dosing module can be implemented as a distributed computing system or environment in which components are located on different computing devices that are connected to each other through network (e.g., wired and/or wireless) and/or other forms of direct and/or indirect connections. In such distributed computing systems or environments, tasks can be performed by one or more remote processing devices, or within a cloud of one or more devices, that are linked through one or more communications networks. In a distributed computing environment, program modules can be located in both local and remote computer storage media including media storage devices. Still further, the aforementioned instructions can be implemented, in part or in whole, as hardware logic circuits, which can include a processor.

If a dosing module is not present, the control box of the growth tower will control both the misting and the reflux from the growth towers. When a dosing system is present, the growth tower will only control the misting schedule and read the minimum level sensor to ensure that the misting pump is not turned on when there is no water in the mixing tank. The dosing module may thus include one or more pumps to recirculate or mix the components in the mixing tank.

While the description of various implementations of the dosing module are detailed above, such variations are also envisioned for the control unit of both the germination and growth modules.

(f) Integrated Water Treatment

Water treatment is a crucial part of this system. According to certain aspects, the water treatment may include at least:
- An integrated source of purified water, such as by reverse osmosis. The system may include one or more reverse osmosis units.
- A water tower or a pressurized tank where the purified water accumulates.
- Several mixing tanks where purified water is mixed with nutrients, pH control, and reflux water.
- Reflux tanks where the water circulated in the germination and growth towers is collected and filtered from particles and debris.
- When needed, sterilization is done with ultraviolet lights (instead of chemical or pasteurization methods) so that water can be recirculated without harming the crops.

According to certain aspects, for treatment of water in large scale or commercial operations, the water treatment may further include:
- Active cleaning chambers where cover crops or beneficial bacteria may act on the towers reflux to transform organic matter into useful minerals, or to consumer unwanted minerals that may be formed (e.g. ammonia).
- Cover crops can also be deployed directly on the tower, whether on separate individual trays or even in the same tray as the target crop when convenient.

(g) Media Recycling

Media recycling may be done through multiple means such as, hanging to dry, placing into a disinfectant bath (e.g. bleach), machine washing, centrifugation, fast pasteurization (e.g. HHST—Higher-Heat Shorter Time), and/or irradiation (ultra-violet or other).

(h) Custom Made Greenhouse

Figure 8:
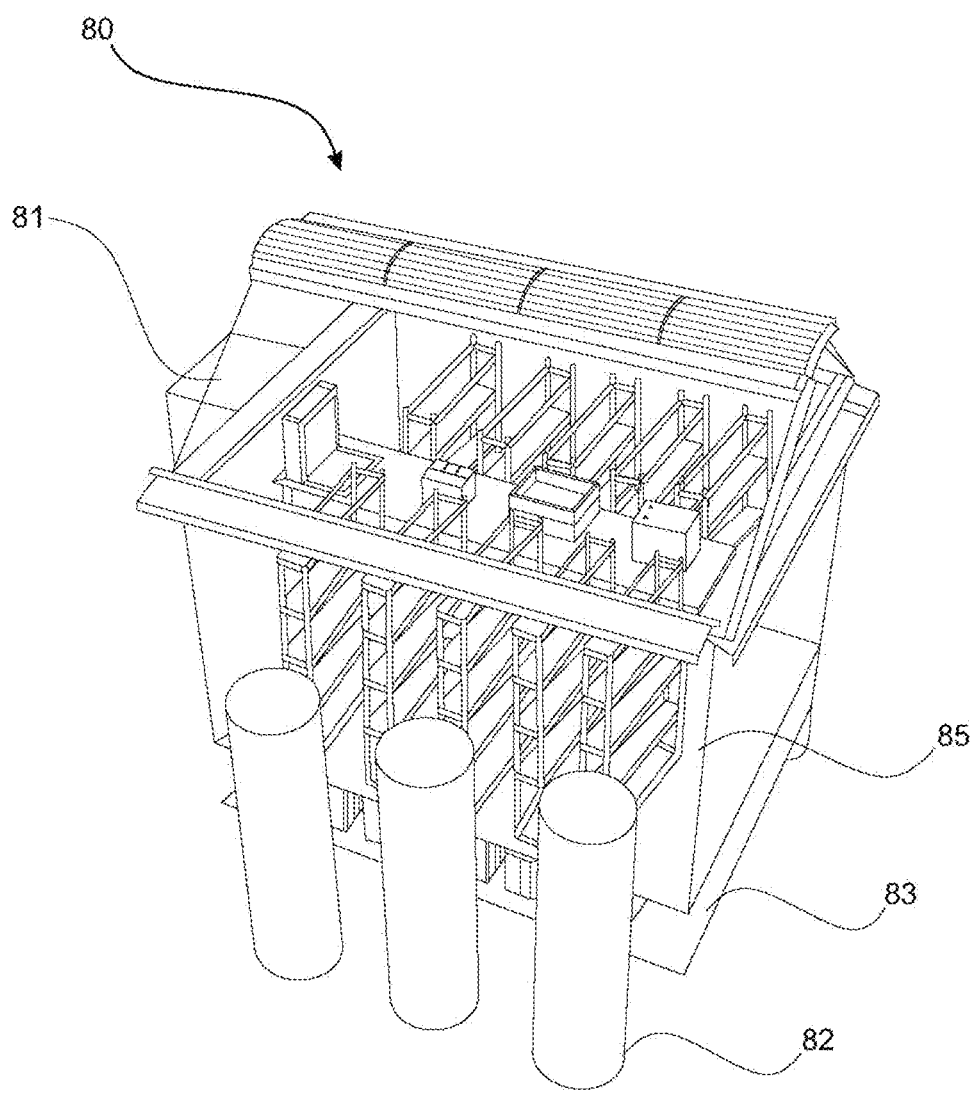
FIG. 8 shows a perspective view of a greenhouse comprising a lower level for germination modules and an upper level for growth modules in accordance with certain aspects of the present disclosure.

As shown in FIG. 8, the system may be positioned within a greenhouse structure 80 to take advantage of ambient thermal and light conditions and reduce some of the external heating/cooling and lighting requirements for plant growth. Moreover, the vertical positioning of the modular trays while in the growth module allows ambient light to reach each tray, further eliminating the need for lighting systems that may reach each level of a horizontally positioned modular tray, such as found in the prior art.

Figure 9:
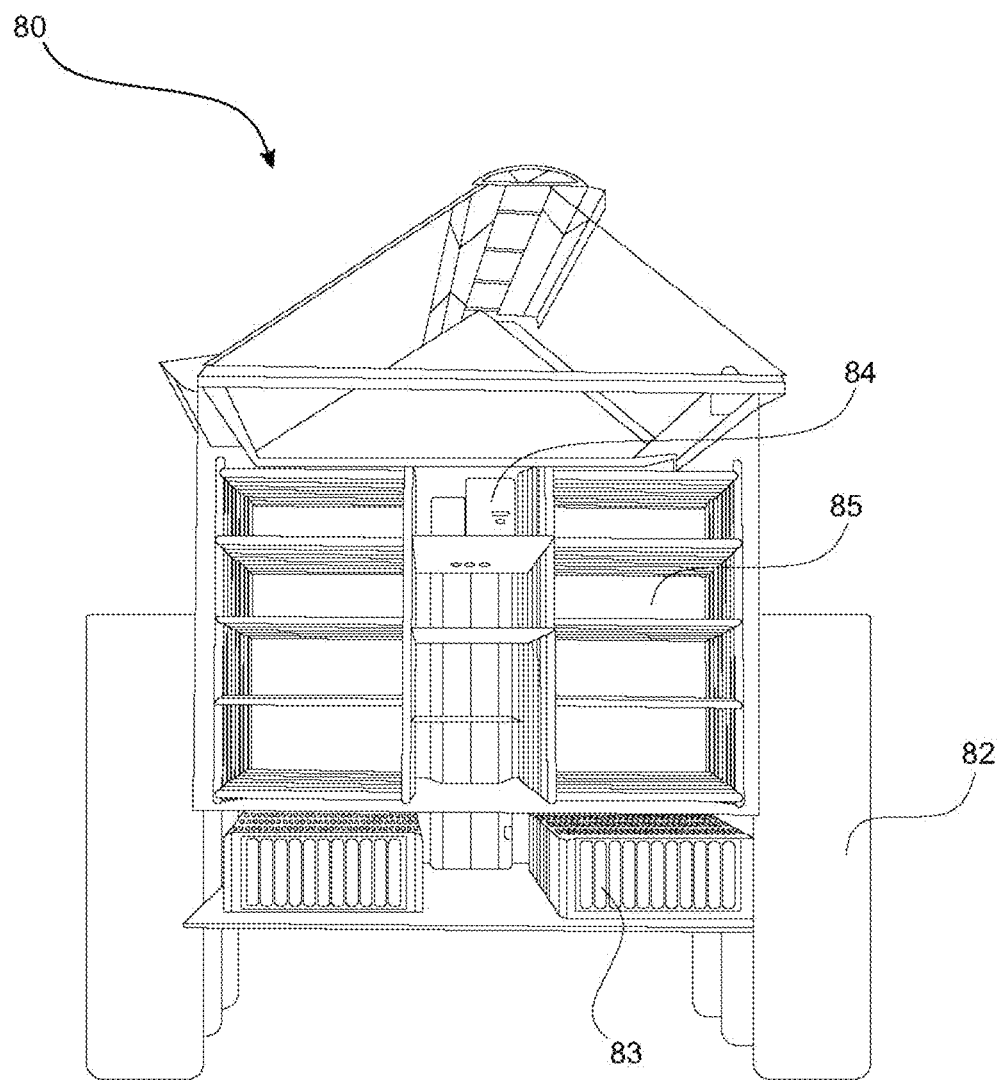
FIG. 9 shows an end view of the greenhouse of FIG. 8 including wind towers at opposing sides of the greenhouse.

As shown in FIGS. 8 and 9, which provide schematic views of an exemplary greenhouse 80 according to certain aspects of the present disclosure, the germination modules may be positioned on a lower level of the greenhouse 83, while the growth modules may be positioned on one or more levels of an upper region 85 of the greenhouse. Partially buried cooling towers 82 may be included which accumulate air that is cycled between a subterranean level where the air is generally at 10-15° C. and the lower and upper regions of the greenhouse.

Also shown in FIG. 8 is a wind tower 81 that may pull air from an upper region and circulate that air to lower regions of the greenhouse, thus providing air circulation within the greenhouse. Various other equipment (84), such as dosing chambers, mixing tanks, HVAC, etc. may be included, such as on an upper level of the system.

Figure 10:
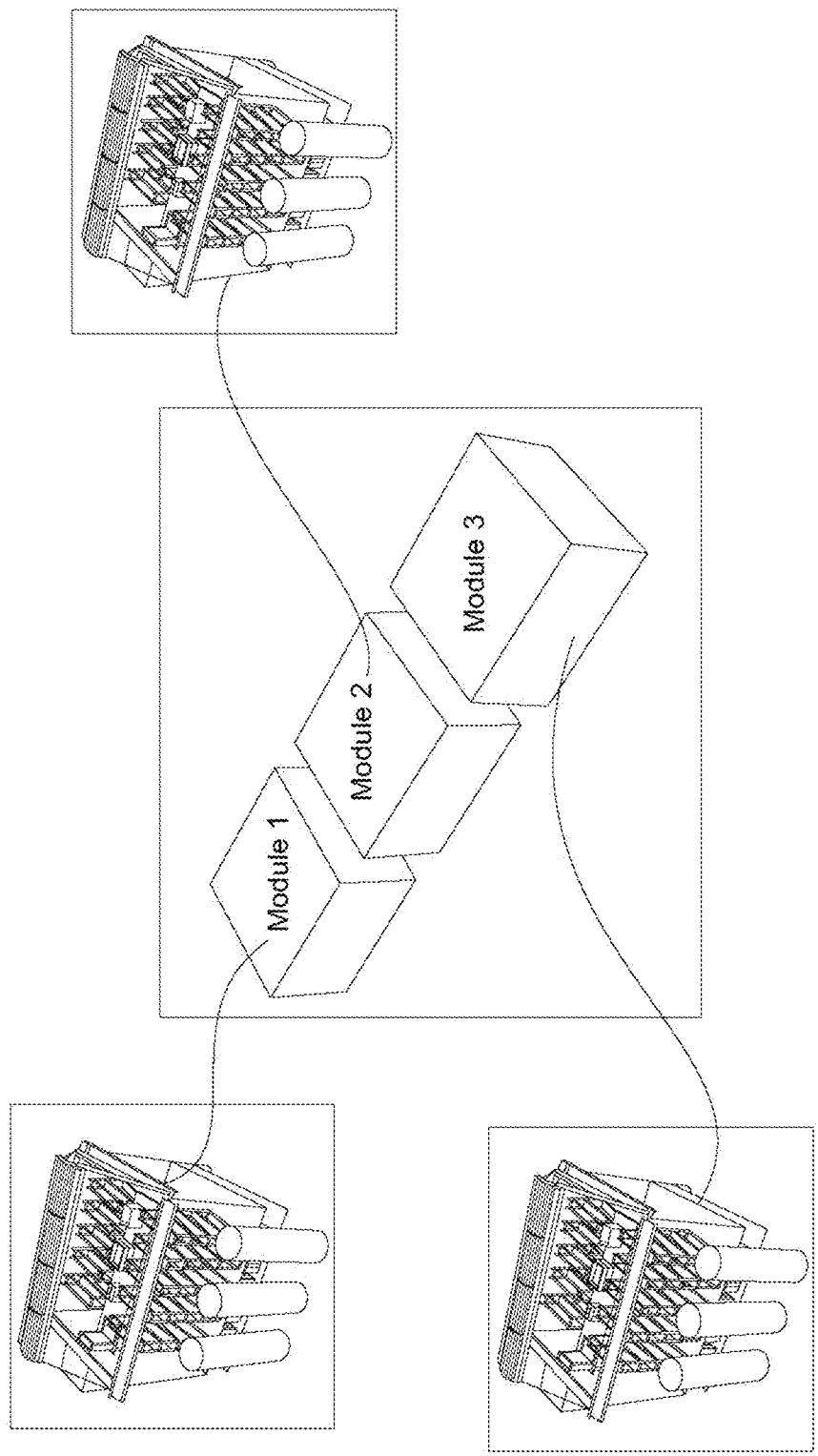
FIG. 10 shows a schematic diagram of a system comprising multiple greenhouses, such as shown in FIGS. 8 and 9 in accordance with certain aspects of the present disclosure.

With reference FIG. 10, additional greenhouses may be included in a larger system, wherein each greenhouse may be individually controlled to optimize production of a specific crop, or of one or more complementary crops.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to the systems and methods described herein.

The present disclosure provides the following aspects:

Aspect 1: A system for high density plant growth comprising: at least one modular tray; a germination module configured to support the at least one modular tray in a horizontal position; a growth module configured to accept the at least one modular tray in a vertical orientation; a reflux tank configured to accept fluids draining from the at least one modular tray and a watering system in the germination module, growth module, or both; a mixing tank configured to accept fluid from the reflux tank and water; and a dosing module configured to provide nutrients to the mixing tank.

Aspect 2: The system according to any previous aspect, wherein the at least one modular tray comprises a flexible substrate attached to an open frame.

Aspect 3: The system according to any previous aspect, wherein the substrate is a single layered or multi-layered continuous media.

Aspect 4: The system according to any previous aspect, wherein the substrate comprises a recyclable porous textile.

Aspect 5: The system according to any previous aspect, wherein the substrate comprises at least two layers configured to provide root growth therebetween.

Aspect 6: The system according to any previous aspect, wherein the mixing tank uses a hysteresis cycle comprising a reflux pump configured to turn on when a water level in the mixing tank reaches a low water limit and turn off when the water level in the mixing tank reaches a high-water limit.

Aspect 7: The system according to any previous aspect, wherein each of the germination module and the growth module comprise a vertical watering system, wherein the vertical watering system of the growth module is mounted on and moveable along at least one horizontal rail.

Aspect 8: The system according to aspect 7, wherein the vertical watering system provides water and nutrients from the mixing tank to a surface of the at least one modular tray.

Aspect 9: The system according to aspect 8, wherein the surface watered by the vertical watering system in the growth module is opposite from a surface on which germination occurred in the germination module.

Aspect 10: The system according to any previous aspect, wherein the vertical watering system of the growth module comprises a cart moveable along two horizontal rails having suspended therefrom a flexible mister, wherein contact sensors at the end of the rails cause the cart to change direction.

Aspect 11: The system according to aspect 10, wherein the growth module comprises two or more levels configured to accept a plurality of module growth trays, and the flexible mister comprises a misting nozzle positioned thereon to provide the water and nutrients to each of the two or more levels.

Aspect 12: The system according to any previous aspect, wherein the mixing tank comprises a sedimentation filter that purifies fluids prior to entry to the mixing tank.

Aspect 13: The system according to any previous aspect, wherein the water supplied to the mixing tank is purified by reverse osmosis.

Aspect 14: A method of high-density vertical farming, the method comprising: providing the system according to any one of aspects 1 to 14; attaching at least one layer of a flexible substrate material to at least one modular tray; positioning seeds on a top surface of the substrate material attached to the at least one modular tray and positioning the tray horizontally in the germination module with the top surface faces upward; watering the seeds on the at least one modular tray in the germination module from the mixing tank; upon germination of the seeds, moving the at least one modular tray to the growth module and positioning vertically therein; and watering the germinated seeds on the at least one modular tray in the growth module from the mixing tank.

Aspect 15: The method according to any previous method aspect, further comprising, before watering the seeds in the germination module, sterilizing the seeds in the germination module.

Aspect 16: The method according to any previous method aspect, wherein the sterilizing uses a mixture of water and hydrogen peroxide.

Aspect 17: The method according to any previous method aspect, further comprising: changing a concentration of nutrients, a pH, or both supplied to the mixing tank using the dosing module throughout a growth phase of the germinated seeds in the growth module.

Aspect 18: The method according to any previous method aspect, further comprising using a hysteresis cycle within the mixing tank, wherein the hysteresis cycle comprises turning on a reflux pump when a water level in the mixing tank reaches a low water limit and turning off the reflux pump when the water level in the mixing tank reaches a high-water limit, wherein the reflux pump pulls water from the reflux tank.

Aspect 19: The method according to any previous method aspect, further comprising suppling excess water from each of the germination and growth modules to the reflux tank, wherein the excess water is passed through a sedimentation filter on entry to the reflux tank.

Aspect 20: The method according to any previous method aspect, further comprising watering the germinated seeds in the growth tower using the vertical watering system, wherein the vertical watering system comprises a cart moveable along two horizontal rails having suspended therefrom a flexible mister, wherein contact sensors at the end of the rails cause the cart to change direction.

What is claimed is:

1. A system for high density plant growth comprising:
   at least one modular tray comprising a frame having an open central region and a flexible substrate comprising a recyclable porous textile, wherein the flexible substrate is attachable along at least two opposing perimeter sides of the frame so that it spans the open central region of the frame, and wherein each of a first side and a second side of the flexible substrate are exposed;
   a germination module comprising:
      a tower having a plurality of vertically spaced mounts configured to support the at least one modular tray in a horizontal orientation with the first side facing upward, wherein additional modular trays are stacked vertically within the tower on the vertically spaced mounts, and
      a vertical watering system having vertically spaced misting nozzles positioned at corners of the tower;
   a growth module comprising at least a first rack horizontally spaced apart from a second rack, each of the first and second racks comprising vertically spaced supports configured to maintain the at least one modular tray in a vertical orientation with the first side facing outward and the second side facing inward toward a vertical watering system;
   a vertical watering system in each of the germination module and the growth module;
   a reflux tank configured to accept fluids draining from (i) the at least one modular tray and (ii) the vertical watering system in the germination module, growth module, or both;
   a mixing tank configured to accept fluid from the reflux tank and water; and
   a dosing module configured to provide nutrients, pH adjustment, and water to the mixing tank,
   wherein the mixing tank uses a hysteresis cycle comprising a reflux pump configured to turn on when a water level in the mixing tank reaches a low water limit and turn off when the water level in the mixing tank reaches a high-water limit, and wherein the dosing module uses proportional control to add one or more of the nutrients, pH adjustment, and water to the mixing tank based on sensor readings within the mixing tank.

2. The system of claim 1, wherein the recyclable porous textile is a single layered or multi-layered continuous porous textile.

3. The system of claim 1, wherein the recyclable porous textile comprises at least two layers configured to provide root growth therebetween.

4. The system of claim 1, wherein the mixing tank comprises a sedimentation filter that purifies the fluids accepted from the reflux tank prior to entry to the mixing tank.

5. The system of claim 1, wherein the water supplied to the mixing tank is purified by reverse osmosis.

6. A method of high-density vertical farming, the method comprising:
providing the system of claim 1;
attaching at least one layer of the flexible substrate material to at least one of the modular trays;
positioning seeds on a top surface of the flexible substrate material attached to the at least one modular tray and positioning the tray horizontally in the germination module with the top surface facing upward;
watering the seeds on the at least one modular tray in the germination module from the mixing tank;
upon germination of the seeds, moving the at least one modular tray to the growth module and positioning the at least one modular tray vertically therein; and
watering the germinated seeds on the at least one modular tray in the growth module from the mixing tank.

7. The method of claim 6, further comprising, before watering the seeds in the germination module, sterilizing the seeds in the germination module.

8. The method of claim 7, wherein the sterilizing uses a mixture of water and hydrogen peroxide.

9. The method of claim 6, further comprising:
changing a concentration of nutrients, a pH, or both supplied to the mixing tank using the dosing module throughout a growth phase of the germinated seeds in the growth module.

10. The method of claim 6, further comprising: using the hysteresis cycle within the mixing tank, wherein the hysteresis cycle comprises turning on the reflux pump when the water level in the mixing tank reaches the low water limit and turning off the reflux pump when the water level in the mixing tank reaches the high-water limit, wherein the reflux pump pulls water from the reflux tank.

11. The method of claim 6, further comprising:
supplying excess water from each of the germination and growth modules to the reflux tank, wherein the excess water is passed through a sedimentation filter on entry to the reflux tank.

12. The method of claim 6, further comprising:
watering the germinated seeds in the growth tower using the vertical watering system, wherein the vertical watering system comprises a cart moveable along two horizontal rails having suspended therefrom a flexible mister, wherein contact sensors at the end of the rails cause the cart to change direction.

13. The system of claim 1, wherein the sensor readings within the mixing tank are continuous readings of pH and electrical conductivity to provide real-time control of the pH and a nutrient level of the fluid in the mixing tank.

14. The system of claim 1, wherein the dosing module is configured to provide the pH adjustment to the mixing tank to correct a pH in the mixing tank in a single direction only.

15. A system for high density plant growth comprising:
at least one modular tray comprising a frame having an open central region and a flexible substrate comprising a recyclable porous textile, wherein the flexible substrate spans the open central region and is attached along at least two opposing perimeter sides of the frame, and wherein each of a first side and a second side of the flexible substrate are exposed;
a germination module configured to support the at least one modular tray in a horizontal position with the first side facing upward;
a growth module comprising at least a first rack horizontally spaced apart from a second rack, each of the first and second racks comprising vertically spaced supports configured to maintain the at least one modular tray in a vertical orientation with the first side facing outward and the second side facing inward;
a reflux tank configured to accept fluids draining from the at least one modular tray and a watering system in the germination module, growth module, or both;
a mixing tank configured to accept fluid from the reflux tank and water; and
a dosing module configured to provide nutrients to the mixing tank,
wherein each of the germination module and the growth module comprises a vertical watering system,
wherein the vertical watering system of the growth module comprises a motorized cart moveable along two horizontal rails having suspended therefrom a vertically extending flexible mister comprising a plurality of vertically spaced mister nozzles that provide water and nutrients from the mixing tank to the second side of the at least one modular tray when in the vertical orientation, wherein contact sensors at ends of the rails cause the cart to change direction when the cart comes in contact therewith.

16. The system of claim 15, wherein the surface of the at least one modular tray that is watered by the vertical watering system in the growth module is opposite from a surface on which germination occurred in the germination module.

17. The system of claim 15, wherein the growth module comprises two or more vertically spaced supports each configured to accept the at least one modular tray, and the plurality of mister nozzles provide the water and nutrients to each of the two or more vertically spaced supports.

18. The system of claim 15, wherein the flexible substrate comprises at least two layers configured to provide root growth therebetween.

19. The system of claim 15, wherein the motorized cart of the vertical watering system of the growth module comprises four drive wheels, wherein at least two of the four drive wheels are direct drive wheels.

20. The system of claim 19, wherein the motorized cart of the vertical watering system of the growth module further comprises at least two non-powered wheels that provide alignment of the motorized cart on the two horizontal rails.

21. A method of high-density vertical farming, the method comprising:
providing the system of claim 15;
attaching at least one layer of the flexible substrate material to at least one of the modular trays;
positioning seeds on a top surface of the flexible substrate material attached to the at least one modular tray and positioning the tray horizontally in the germination module with the top surface facing upward;
watering the seeds on the at least one modular tray in the germination module from the mixing tank;
upon germination of the seeds, moving the at least one modular tray to the growth module and positioning the at least one modular tray vertically therein; and
watering the germinated seeds on the at least one modular tray in the growth module from the mixing tank.

22. A system for high density plant growth comprising:
a plurality modular trays each comprising a frame having an open central region and a flexible substrate comprising a recyclable porous textile, wherein the flexible substrate is attachable along at least two opposing perimeter sides of the frame so that it spans the open central region of the frame, and wherein each of a first side and a second side of the flexible substrate are exposed;

a germination module comprising a tower having a plurality of vertically spaced mounts, each of the plurality of vertically spaced mounts supporting one of the plurality of modular trays in a horizontal orientation with the first side facing upward, and a vertical watering system comprising vertically spaced misting nozzles positioned at corners of the tower;

a growth module comprising at least a first rack horizontally spaced apart from a second rack, each of the first and second racks comprising vertically spaced supports configured to maintain the modular trays in a vertical orientation with the first sides facing outward and the second sides facing inward toward a vertical watering system;

a reflux tank configured to accept fluids draining from the plurality modular trays and a watering system in the germination module, growth module, or both;

a mixing tank configured to accept fluid from the reflux tank and water; and a dosing module configured to provide nutrients, pH adjustment, and water to the mixing tank, wherein the vertical watering system of the growth module comprises a motorized cart moveable along two horizontal rails having suspended therefrom a vertically extending flexible mister comprising a plurality of vertically spaced mister nozzles that provide water and nutrients from the mixing tank to the second sides of the modular trays.

* * * * *